US008507072B2

(12) United States Patent
Fujimoto et al.

(10) Patent No.: US 8,507,072 B2
(45) **Date of Patent: *Aug. 13, 2013**

(54) ANTENNA APPARATUS

(75) Inventors: Hidetsugu Fujimoto, Miyazaki (JP); Kengo Shiiba, Miyazaki (JP); Hiromi Sakita, Miyazaki (JP); Kouji Nishimura, Miyazaki (JP); Kouichi Watanabe, Miyazaki (JP); Yumie Watanabe, legal representative, Miyazaki (JP); Hatsuhiro Yano, Miyazaki (JP); Yoshihiko Takayama, Miyazaki (JP); Yoshitaka Mizoguchi, Fukuoka (JP)

(73) Assignee: Panasonic Corporation, Osaka (JP)

( * ) Notice: Subject to any disclaimer, the term of this patent is extended or adjusted under 35 U.S.C. 154(b) by 270 days.

This patent is subject to a terminal disclaimer.

(21) Appl. No.: 13/041,106

(22) Filed: Mar. 4, 2011

(65) Prior Publication Data

US 2011/0151234 A1 Jun. 23, 2011

Related U.S. Application Data

(63) Continuation of application No. 11/658,258, filed as application No. PCT/JP2005/014240 on Jul. 28, 2005, now Pat. No. 7,924,235.

(30) Foreign Application Priority Data

Jul. 28, 2004 (JP) ................................ 2004-219754
Jul. 28, 2004 (JP) ................................ 2004-219756
Sep. 27, 2004 (JP) ................................ 2004-279072
May 16, 2005 (JP) ................................ 2005-142656

(51) Int. Cl.
*G11B 5/64* (2006.01)

(52) U.S. Cl.
USPC ........... 428/141; 428/221; 428/429; 343/787; 343/788

(58) Field of Classification Search
USPC .................. 343/787, 788; 428/141, 221, 429
See application file for complete search history.

(56) References Cited

U.S. PATENT DOCUMENTS 4,908,258 A 3/1990 Hernandez
5,364,685 A 11/1994 Nakashima (Continued)

FOREIGN PATENT DOCUMENTS

GB 2325568 11/1998
JP 62008504 1/1987

(Continued)

OTHER PUBLICATIONS

Japanese Office Action dated Mar. 30, 2010 with English Translation.

(Continued)

*Primary Examiner* — Tan Ho
(74) *Attorney, Agent, or Firm* — Dickinson Wright PLLC

(57) ABSTRACT

An antenna apparatus used in a wireless communication medium or a wireless communication medium processing apparatus constructed by a constitution of including a magnetic member in which a magnetic ceramic powder is used as a major component thereof and which is provided with flexibility; an antenna formed at a surface or inside of the magnetic member, and a matching circuit of the antenna formed at the surface or the inside of the magnetic member.

13 Claims, 15 Drawing Sheets

(56) References Cited

U.S. PATENT DOCUMENTS

| | | | | |
|---|---|---|---|---|
| 5,892,661 | A | 4/1999 | Stafford | |
| 6,292,139 | B1 | 9/2001 | Yamamoto | |
| 6,320,547 | B1 | 11/2001 | Fathy et al. | |
| 6,639,556 | B2 | 10/2003 | Baba | |
| 7,924,235 | B2 * | 4/2011 | Fujimoto et al. | 343/787 |
| 2002/0093396 | A1 | 7/2002 | Smith | |
| 2003/0008182 | A1 | 1/2003 | Saitoh et al. | |
| 2003/0160366 | A1 * | 8/2003 | Fukuta et al. | 264/630 |
| 2009/0117328 | A1 * | 5/2009 | Kawai et al. | 428/141 |
| 2011/0206870 | A1 * | 8/2011 | Aravamudan | 428/15 |

FOREIGN PATENT DOCUMENTS

| | | |
|---|---|---|
| JP | 59-40337 | 9/1987 |
| JP | 1151855 | 10/1989 |
| JP | 01-291936 | 11/1989 |
| JP | 02-111539 | 4/1990 |
| JP | 03-501426 | 3/1991 |
| JP | 3-196602 | 8/1991 |
| JP | 3-90371 | 9/1991 |
| JP | 390371 | 9/1991 |
| JP | 05-042623 | 2/1993 |
| JP | 09-039159 | 2/1997 |
| JP | 09-314747 | 12/1997 |
| JP | 10138672 | 5/1998 |
| JP | 200059260 | 2/2000 |
| JP | 2000293655 | 10/2000 |
| JP | 2001-200117 | 7/2001 |
| JP | 2002179925 | 6/2002 |
| JP | 2002-298095 | 10/2002 |
| JP | 2003218626 | 7/2003 |
| JP | 2004187159 | 7/2004 |
| JP | 2004200829 | 7/2004 |
| JP | 2004312459 | 11/2004 |
| JP | 2005-015293 | 1/2005 |
| WO | 2004-006165 | 1/2004 |

OTHER PUBLICATIONS

Japanese Office Action dated May 25, 2010 with English Translation.
Japanese Office Action dated Feb. 2, 2010 with partial English translation.
Japanese Office Action dated Jun. 16, 2009 with English translation.
Information and Reasons of Submission dated Aug. 7, 2009 with English translation.
Japanese Office Action dated Feb. 3, 2009 with English translation.
PCT International Search Report dated Nov. 9, 2005.
Y. Rao, et al.: "Di-block copolymer suclactant study to optimize filler dispersion in high dielectric constant polymer-ceramic composite," Composites Part A: Applied Science and Manufacturing, Elsevier Science Publishers B.V., Amsterdam, NL, vol. 34, No. 11, Nov. 2003, pp. 1113-1116. XP004460232.
Patent Abstracts of Japan, vol. 1997, No. 11, Nov. 28, 1997, & JP 09 083110 A (Nec Corp; Nec Eng Ltd), Jul. 15, 1997.
Patent Abstracts of Japan, vol. 1995, No. 1, Feb. 28, 1995 & JP 06 303018 A (Matsushita Electric Ind Co. Ltd.) Oct. 28, 1994.

* cited by examiner

ANTENNA APPARATUS

This is a continuation application of application Ser. No. 11/658,258 filed Jan. 24, 2007, which is a national stage of PCT/JP2005/014240 filed Jul. 28, 2005, which is based on Japanese Application No. 2004-219754 filed Jul. 28, 2004, Japanese Application No. 2004-219756 filed Jul. 28, 2004, Japanese Application No. 2004-279072 filed Sep. 27, 2004, and Japanese Application No. 2005-142656 filed May 16, 2005, the entire contents of each which are incorporated by reference herein.

TECHNICAL FIELD

The present invention relates to an antenna apparatus formed at a magnetic member increasing a magnetic field intensity by forming a closed circuit of a magnetic field in an antenna used in a wireless communication medium processing apparatus for communicating with a wireless communication medium of RF-ID, that is, an IC card, an IC tag or the like, or an antenna mounted on the wireless communication medium per se or the like.

BACKGROUND ART

In a background art, an antenna used in a wireless communication processing apparatus for communicating with a wireless communication medium by an electromagnetic induction system, or the wireless communication medium per se is accompanied by a hazard that the antenna is influenced by a metal present at a surrounding thereof, a magnetic field is weakened, mutual inductance necessary for communication becomes insufficient, a communication distance is shortened or communication cannot be carried out. Hence, in order to prevent the antenna from being effected with the influence of the metal, it has been devised to separate the antenna and the metal by a spacer or the like, or intensifying the magnetic field generated by the antenna by installing a magnetic member by ferrite or the like to be proximate to or to be brought into contact with the antenna.

Further, thin-sized formation to an extreme is requested for an IC card or an IC tag, and an ID card or an ID tag or the like constituting a wireless communication medium in order to facilitate portability thereof or integrating the wireless communication medium to a portable telephone or an information terminal. This is similar even to a wireless communication medium processing apparatus of a reader or a reader/writer or the like for communicating data with a wireless communication medium.

Here, when the spacer or the like is used, there poses a problem that adjustment in stalling the spacer and operability involved with the-adjustment becomes complicated and further, a shape, particularly a thickness of a total of the antenna is increased and thin-sized formation becomes difficult. Further, although as the magnetic member, a bulk material of ferrite which is sintered and having a high hardness or the like is used, there poses a problem that the bulk member is inferior in cracking in dropping the magnetic member or a workability thereof.

There has been proposed a constitution of installing a magnetic body in a flexible shape to a bottom face or a side face of an antenna in order to provide durability against destruction while realizing to intensify a magnetic field in this way. By using the magnetic body in the flexible shape, an extra thickness is not needed different from the case of using the spacer or the like, further, the magnetic member is strong at destruction and therefore, an antenna apparatus as well as a wireless communication medium and a wireless communication medium processing apparatus having high durability of use can be realized (refer to, for example, JP-A-2002-298095).

However, the magnetic body in the flexible shape shown in JP-A-2002-298095 uses sendust, permalloy or the like of a metal magnetic powder and therefore, in order to ensure workability capable of forming a sufficient shape, it is necessary to mix a sufficient amount of an organic material, according to the flexible magnetic body including much of the organic material, even when the flexible magnetic body is arranged at a vicinity of the antenna, it is insufficient to intensify a magnetic field to pose a problem that the flexible magnetic body is insufficient for expanding a communication distance of a wireless communication medium processing apparatus which is requested in recent years.

Further, the flexible magnetic body constituted by the metal magnetic powder and the organic material poses a problem that workability is poor, cost is increased and also durability against destruction is insufficient yet although the workability, the cost and durability are not as worse as those of sintered ferrite.

Further, according to the magnetic body constituted by the metal magnetic powder and the organic material, an insulating resistance thereof is low and therefore, a conductive member cannot be formed on the magnetic member or inside of the magnetic member and therefore, a radiating conductor or a terminal electrode forming an antenna and various circuits of a matching circuit or the like connected to the antenna cannot be formed. Therefore, similar to the case of using the magnetic member of the background art having a high hardness of sintered ferrite or the like, there poses a problem that it is necessary to separately form an antenna and a matching circuit or a processing circuit connected thereto by a conductor of a metal or the like to arrange to be proximate to or brought into contact with the magnetic member to constitute a limit in thin-sized formation.

Therefore, in addition to a problem that since durability of the magnetic member is weak, durability in practical use is weak, there poses a problem that thin-sized formation of an antenna apparatus is difficult and there is a limit in small-sized formation or thin-sized formation of a wireless communication medium or a wireless communication medium processing apparatus integrated therewith.

DISCLOSURE OF INVENTION

It is an object of the invention to resolve the above-described problems to provide an antenna apparatus used in a wireless communication medium or a wireless communication medium processing apparatus realizing thin-sized formation and small-sized formation by forming an antenna or a matching circuit directly to a surface or inside of a magnetic member promoting a magnetic field intensity necessary for expanding a communication distance by excluding an influence of a metal at a surrounding after providing flexibility and promoting durability strong at damage or destruction.

The invention is an antenna apparatus used in a wireless communication medium or a wireless communication medium processing apparatus constructed by a constitution of including a magnetic member in which a magnetic ceramic powder is used as a major component thereof and which is provided with flexibility, an antenna formed at a surface or inside of the magnetic member, and a matching circuit of the antenna formed at the surface or the inside of the magnetic member.

The invention can realize a thin-sized antenna apparatus at low cost since a magnetic member having a high flexibility comprising a magnetic ceramic powder is used, a radiating conductor, a terminal electrode and a matching circuit of an antenna are formed at a surface and inside of the magnetic member by a plating transcribing method or a screen printing method, and respective portions can be connected by a via hole. Further, by forming the magnetic member by the magnetic ceramic powder, the flexibility of the magnetic member is much promoted and the antenna apparatus promoting the durability strong at damage or destruction can be constituted.

BEST MODE FOR CARRYING OUT THE INVENTION

An embodiment of the invention will be explained in reference to the drawings as follows.

(Embodiment 1)

Further, a magnetic member according to the invention :is fabricated such that a necessary material of a ferrite ceramic powder is subjected to predetermined baking to thereafter produce a powder which is thereafter mixed with an organic solvent or the like to be shaped in a sheet-like shape, or a plate-like shape, or a film-like shape, and when the magnetic member is shaped finally into a shape of a magnetic member integrated to an antenna apparatus, or after forming the magnetic member, the magnetic member is not subjected to heat treatment of baking, sintering or the like to thereby maintain flexibility. Namely, the magnetic member comprises a green sheet.

Figure 1:
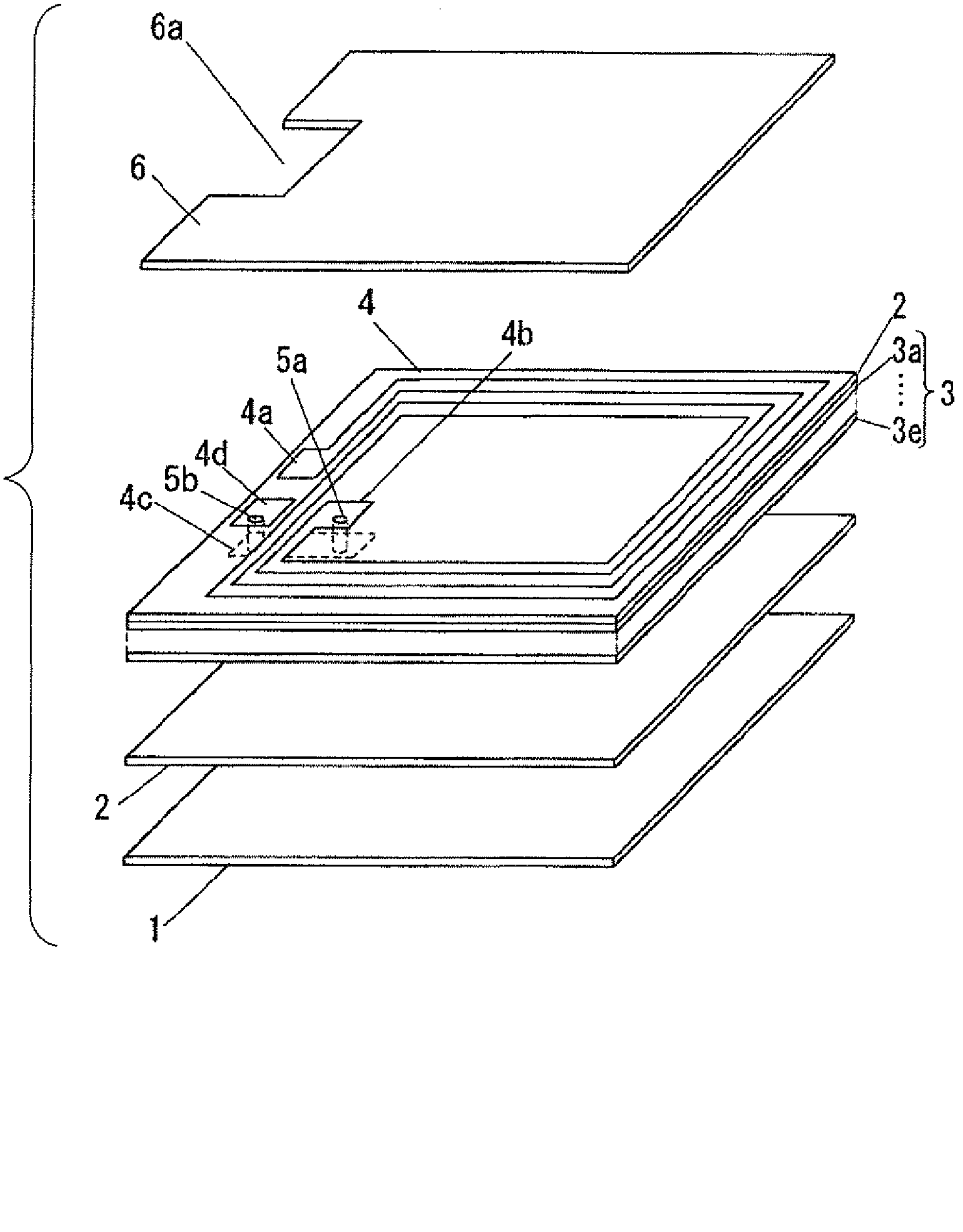
FIG. 1 is a perspective view of an antenna apparatus according to Embodiment 1 of the invention.
Figure 2:
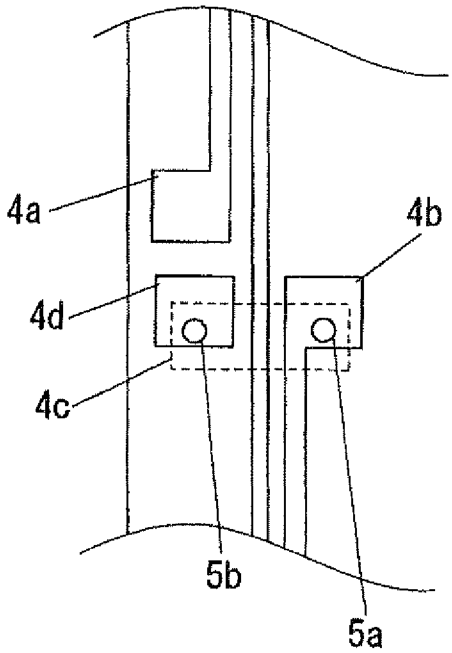
FIG. 2 is a plane view of a lead out portion of an antenna end portion in Embodiment 1 of the invention.
Figure 3:
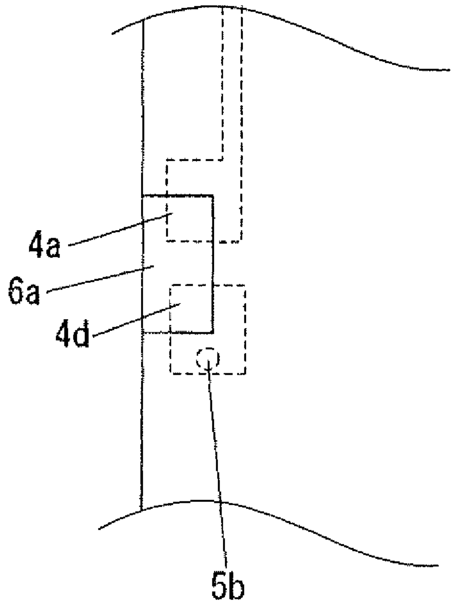
FIG. 3 is a plane view of a lead out portion of an antenna end portion in Embodiment 1.

FIG. 1 is a perspective view of an antenna apparatus according to Embodiment 1 of the invention, FIG. 2 is a plane view of a lead out portion of an antenna end portion in Embodiment 1 of the invention and FIG. 3 is a plane view of a lead out portion of an antenna end portion in Embodiment 1.

The antenna apparatus shown in FIG. 1 is an antenna apparatus formed with an antenna, a matching circuit or the like at a surface or an inner portion of a flexible magnetic member whose major component is a ferrite ceramic powder, the antenna apparatus may be stored to a wireless communication medium of an IC card, an IC tag or the like or may be stored to a wireless communication medium processing apparatus of a reader, a reader/writer or the like.

Numeral 1 designates a metal member, numeral 2 designates an insulting member, numeral 3 designates a magnetic member, notations 3*a* through 3*e* designate magnetic member layers which is the green sheet forming the magnetic member 3, numeral 4 designates an antenna, notations 4*a*, 4*b*, 4*c*, 4*d* designate conductive members forming a matching circuit, notations 5*a*, 5*b* designate via holes, numeral 6 designates a protecting member, and notation 6*a* designates a notched portion.

First, details of respective portions will be explained.

First, the metal member 1 will be explained.

The metal member 1 is formed by aluminum having excellent environment resistance or a good conductor of copper, silver, nickel, gold or the like subjected to a corrosion preventive processing. The metal member may be made to be proximate to the magnetic member 3 via the insulating member 2, mentioned later, or may be brought into contact therewith or pasted thereto. Or, the metal member may be arranged to be made to be proximate to or brought into contact with or pasted to the magnetic member 3 directly without interposing the insulting member 2.

The metal member 1 may be in various modes of a sheet-like shape, or a plate-like shape, or a film-like shape and the like and is a thin sheet having a thickness of preferably about 0.5 mm, further preferably, equal to or smaller than 0.2 mm and is arranged on a rear face of the antenna 4. Thereby, the antenna 4 can stably be operated even when the antenna 4 is arranged to be proximate to a metal or a body having excellent conductivity with regard to high frequency current, and can be integrated to various apparatus without deteriorating a communication distance.

Next, the insulating member 2 will be explained.

The insulting member 2 is the insulting member 2 of a low dielectric constant having a surface resistivity equal to or larger than $1\times10^8\Omega$ arranged to be proximate to or brought into contact with or pasted to the magnetic member 3 comprising a magnetic ceramic powder and is formed, for example, by a polymer resin of PET. The insulating member 2 may be in various modes of a sheet-like shape, or a plate-like shape, or a film-like shape and the like and is preferably a thin sheet having a thickness of preferably equal to or smaller than 0.5 mm, further preferably 0.2 mm. The insulting member 2 is particularly effective when the surface resistivity of the magnetic member 3 comprising the magnetic ceramic powder, mentioned later, is equal to or smaller than $1\times10^8\Omega$.

This is because even when a resistance value of the magnetic member 3 is low, leakage of high frequency current flowing in the antenna 4 can be restrained. Generally, in comparison with Ni—Zn species ferrite, Mn—Zn species ferrite is characterized in that although a magnetic property (permeability) thereof is excellent, a resistance value thereof is low and insulting performance thereof is poor. When such Mn—Zn species ferrite is intended to be used in the magnetic member 3, the insulting member 2 is extremely effective.

Further, when the magnetic member 3 is provided with excellent insulting performance having the surface resistivity equal to or larger than $1\times10^{8}\Omega$, the insulating member 2 may be omitted.

Next, the magnetic member 3 will be explained.

The magnetic member 3 constitutes a major component by a magnetic ceramic powder and is formed by an organic solvent or the like and is a tentatively baked member, excellent in flexibility and durability in comparison with a completely baked bulk member of ferrite in a background art, having a high magnetic component density in comparison with the magnetic member 3 whose major component is a metal magnetic powder and can extremely considerably improve a magnetic field intensity of the antenna 4.

Although the magnetic member 3 may be constituted by a single layer, the magnetic member 3 may be provided with a multilayers structure comprising the magnetic member layers 3*a* through 3*e*, and by constituting the multilayers structure, there is achieved an advantage of capable of forming circuits or conductive members in the respective layers, for example, capable of simply realizing a capacitor as a matching circuit. Particularly, when a capacitor component necessary for a matching circuit is formed, by forming conductive members at magnetic member layers different from a magnetic member layer formed with the antenna 4 (particularly, at portions thereof opposed to an end portion of the antenna 4 for constituting an electricity feeding portion) and making the conductive members opposed to each other, a dielectric member is interposed therebetween and therefore, the capacitor component can easily be generated. That is, a capacitor necessary for the matching circuit can be integrated into the magnetic member 3.

This is because whereas the circuit cannot be formed since a surface resistance of the magnetic member 3 using a metal magnetic powder as in the background art is excessively low, according to the ferrite ceramic powder of the invention, the surface resistance can be increased, starting from the antenna 4, the matching circuit and the like can be formed directly at the surface or the inner portion of the magnetic member 3.

The magnetic member 3 is formed by a ferrite ceramic powder of Ni—Zn species or Mn—Zn species or the like and a bonding agent comprising butyral resin, a phthalic acid species plasticizer and the like. Further, the magnetic member layer is constituted by a shape of a thin sheet (or plate-like shape, film-like shape) formed by about 0.05 mm through 0.3 mm.

Here, a mean particle size of the ferrite ceramic powder constituting the magnetic member 3 is constituted by about 0.1 through 8.0 μm.

When the mean particle is equal to or smaller than 0.1 μm, time is taken for finely crushing the magnetic member 3, further, a large amount of an organic solvent used for forming the magnetic member layer in a sheet-like shape or the like for forming the magnetic member is needed, which is uneconomical. On the other hand, when the mean particle size is equal to or larger than 8.0 μm, a surface roughness of the magnetic member 3 becomes rough, a surface resistance value of the conductive member constituting the antenna 4 is increased, loss in a radiation efficiency of the antenna 4 is brought about and therefore, the value is not preferable. Further, butyral resin and phthalic acid species plasticizer are easy to handle and are effective materials for preventing contamination of environment since an environment load substance or the like is not included therein.

The magnetic member 3 is constituted by a single layer or a multilayers structure of the magnetic member layers 3*a* through 3*e* as necessary, having high flexibility and excellent in durability, having a high surface resistance, easy to form a circuit by pattern printing or plating on the surface and easy to form the via holes 5*a*, 5*b* for connecting a circuit spanning the layers. Therefore, a terminal electrode of the antenna 4 can be formed at an arbitrary location.

Further, it is preferable to include butyral resin for constituting the magnetic member 3 by 4 through 15 wt %. Because when equal or smaller than 4 wt %, shape preserving performance cannot sufficiently be ensured and therefore, the value is not preferable. Further, when equal to or larger than 15 wt %, the magnetic property of the magnetic member is deteriorated and therefore, the value is not preferable. It is preferable to include phthalic acid species plasticizer by 3 through 12 wt %. Because when equal to smaller than 3 wt %, the magnetic member cannot sufficiently be provided with flexibility, which is not preferable. Further, when equal to larger than 12 wt %, a volatile component of the phthalic acid species plasticizer of the magnetic member is increased, an aging change thereof is increased, which is not preferable. Because thereby, a balance between the flexibility and the magnetic field intensity is optimized and the surface resistance realizing to form a circuit can be made to be equal to or larger than $1\times10^{8}\Omega$ in the surface resistivity.

Further, the surface resistivity can be made to be equal to or larger than $1\times10^{8}\Omega$ by making a bulk density equal to or larger than 2.3 g/cm$^3$ and making the surface roughness equal to or smaller than 10 μm.

Further, the optimum balance between the flexibility and the intensity can be achieved by constituting a compression rate in working to form the magnetic member 3 by 10 through 40%.

Further, the magnetic member 3 is provided with pertinent flexibility and therefore, the magnetic member 3 can easily be worked to be punched by punching or the like and therefore, the magnetic member 3 is characterized in that the magnetic member 3 having a complicated shape can be worked at low cost and can be formed by a large amount.

Further, the magnetic member 3 can easily be resolved to disperse in an organic solvent and a dissolved and dispersed portion thereof is provided with adhering performance. In this way, although the magnetic member 3 is insoluble to water, the magnetic member 3 is easy to dissolve to an organic solvent, a dissolved face thereof is provided with adhering performance and therefore, a tape or the like for pasting the magnetic member 3 is not needed and therefore, the magnetic member 3 achieves also effects of low cost and capable of thinning the thickness.

Next, the antenna 4 and the conductive members 4*a* through 4*e* for forming the matching circuit will be explained.

As shown by FIG. 1, it is preferable to constitute the antenna 4 by a loop antenna and by constituting the shape of the loop antenna, a sufficient magnetic field is generated to enable to generate induction power and communicate between a wireless communication medium and a wireless communication processing apparatus by mutual inductance.

Further, it is preferable to constitute the antenna 4 by a loop antenna having an opening portion, since the magnetic member 3 is easy to form a circuit, it is also preferable to constitute the antenna 4, for example, not only by a loop antenna having one turn but also by a loop antenna having two or more turns.

Further, since the surface resistance of the magnetic member 3 is large as described above, a circuit can be formed directly at the surface of the inner portion of the magnetic member 3 and therefore, the antenna 4 and the conductive members 4*a* through 4*e* can be formed directly at the magnetic member 3. For example, a good conductor starting from the metal of gold, silver, copper, aluminum, nickel or the like may be pasted or transcribed by plating or printed by pattern printing. Thereby, whereas in the background art, it is necessary to form the antenna 4 and the conductive members 4*a* through 4*e* separately from the magnetic member 3, the antenna 4 and the conductive members 4*a* through 4*e* for forming the matching circuit can be formed integrally with the magnetic member 3 and therefore, a very thin type antenna apparatus can naturally be formed.

Further, the antenna 4 and the conductive members 4*a* through 4*e* for forming the matching circuit can be formed by a transcribing method described below.

First, a stainless steel plate is formed with a resist film indicating shapes of a predetermined loop antenna and respective electrodes by photolithography. A conductive pattern of silver, copper, nickel, gold, tin or the like is precipitated thereto by using a plating method and the conductive pattern is brought into press contact to transcribe to the magnetic member 3. According to the method, in comparison with the screen printing, a very fine pattern can accurately be formed. The method is very useful in providing the matching circuit, mentioned later, at inside of the antenna.

Further, the end portions of the antenna 4, that is, the conductive members 4*a* through 4*e* as terminal electrodes may be formed on both sides of the loop as shown by FIG. 2 or FIG. 3 or may be formed to be opposed to each other at the end portions of the loop.

Next, the via holes 5*a* and 5*b* will be explained.

The via holes 5*a* and 5*b* are used to connect to conduct conductive members provided at different layers of the magnetic member 3 having the multilayers structure. For example, the via holes 5*a*, 5*b* are used when conductive members formed at the inner magnetic member layers formed as the matching circuit are connected. Or, when the antenna 4 is formed at the inner magnetic member layers, the via holes 5*a*, 5*b* are used as lead out portions for connecting with a processing circuit of IC or the like included in the wireless communication medium or used as lead out portions for connecting reading/writing portions included in the wireless communication medium processing apparatus.

Next, the antenna protecting member 6 and the notched portion 6*a* will be explained.

The antenna protecting member 6 is provided with the notched portion 6*a* and covers a total of the antenna 4 to protect except the lead out portions of the antenna 4 as shown by FIG. 1. Thereby, promotion of environment resistance and prevention of mechanical damage of the antenna 4 can be realized.

As described above, by the magnetic member 3 whose major component is the ferrite ceramic powder, the magnetic member 3 having the high surface resistance is realized and different from the background art, the antenna 4 and the matching circuit can be formed directly at the surface or the inner portion of the magnetic member 3. Thereby, thinning equal to or superior to that in the background art is naturally realized, further, the magnetic member 3 is brought into a state of being proximate to or brought into contact with the antenna 4 and therefore, a closed circuit of a magnetic field is formed by the magnetic member 3, the magnetic field intensity is promoted, and by the wireless communication medium or the wireless communication medium processing apparatus integrated with the antenna apparatus, the communication distance between the wireless communication medium and the wireless communication medium processing apparatus can considerably be prolonged. Thereby, a system which is very easy to handle can be realized.

Further, since the magnetic member 3 is provided with the flexibility, durability against destruction or damage can be promoted and durability in fabricating, transporting and using can be promoted.

Further, although the magnetic member layers 3*a* through 3*e* have been explained as the green sheet, it is not necessarily needed that the magnetic member 3 is constituted by the green sheet. The magnetic member 3 can be constituted a plurality of blocks baked by constituting a major component thereof by the magnetic ceramic powder.

(Embodiment 2)

Next, Embodiment 2 of the invention will be explained.

In Embodiment 2, an explanation will mainly be given of a case of mounting an antenna apparatus to a wireless communication medium processing apparatus starting from a reader or a reader/writer, or a wireless communication medium of an IC card or the like.

Figure 4:
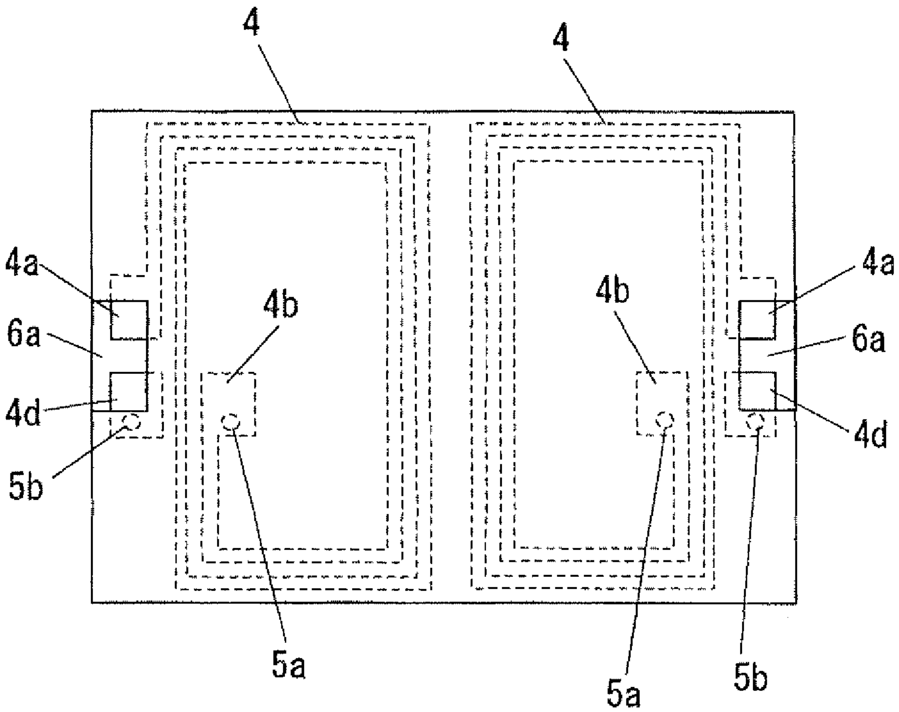
FIG. 4 is a plane view of an antenna apparatus according to Embodiment 2 of the invention.
Figure 5:
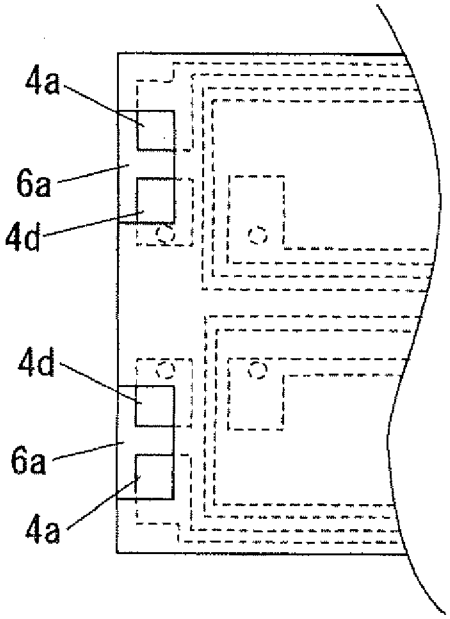
FIG. 5 through FIG. 7 are plane views of portions of the antenna apparatus according to Embodiment 2 of the invention.
Figure 6:
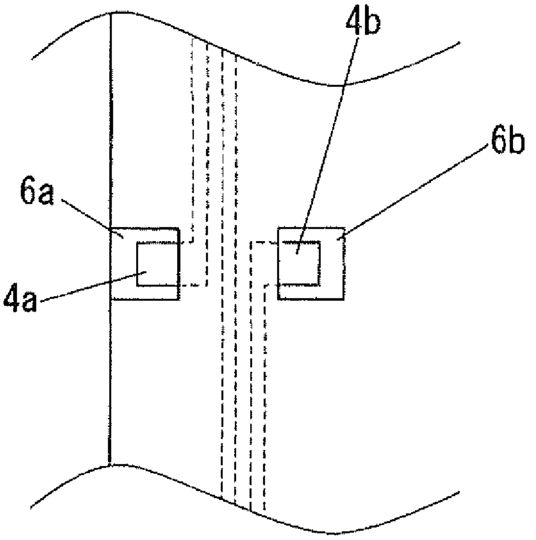
Figure 7:
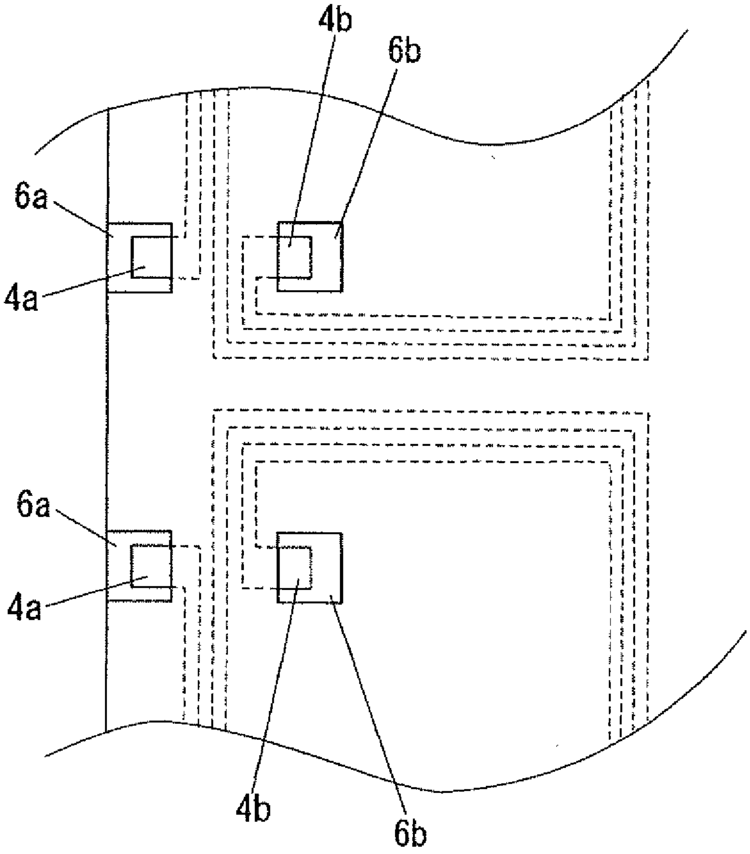
Figure 8:
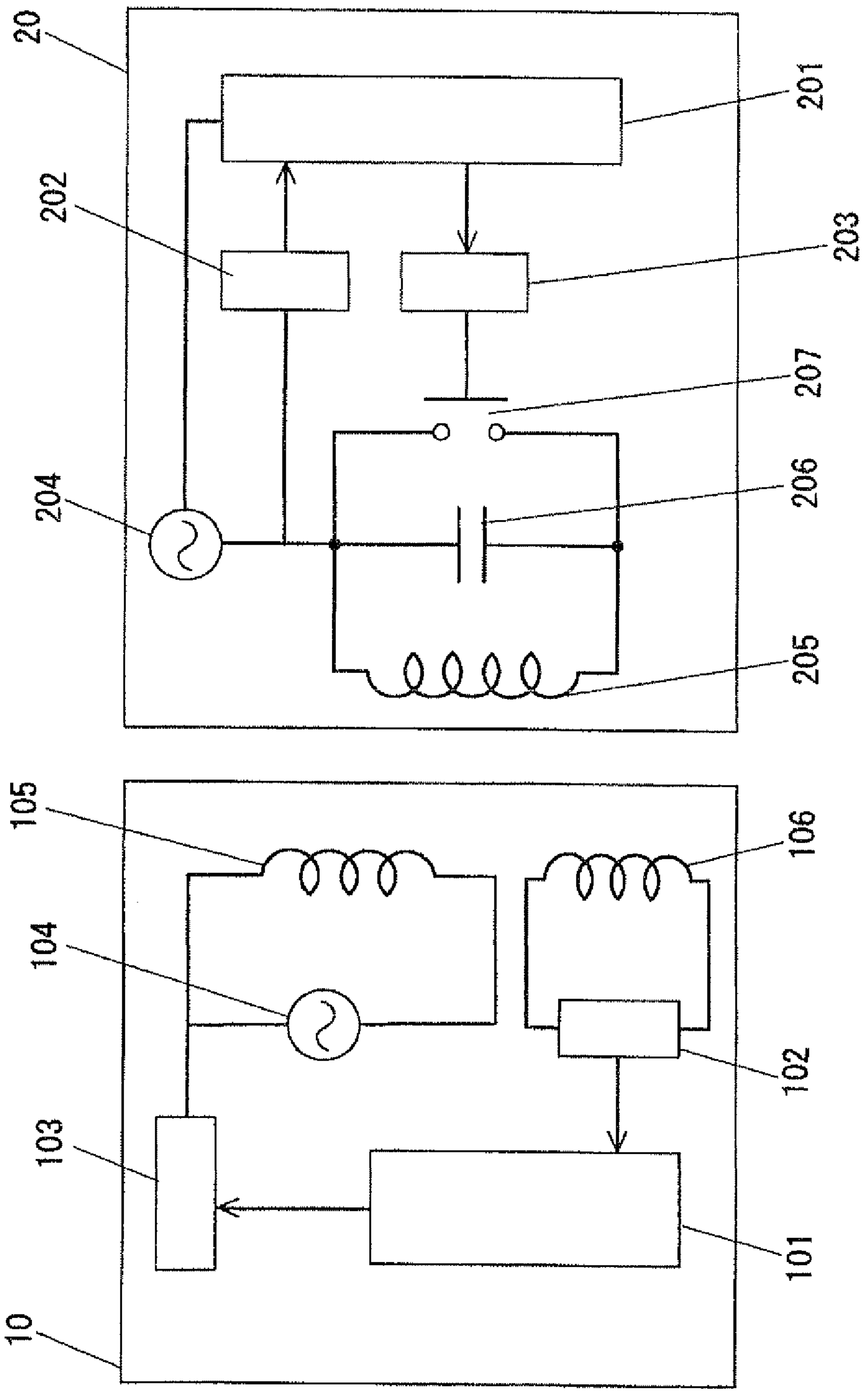
FIG. 8 is a constitution view of a wireless communication medium processing apparatus according to Embodiment 2 of the invention.
Figure 9:
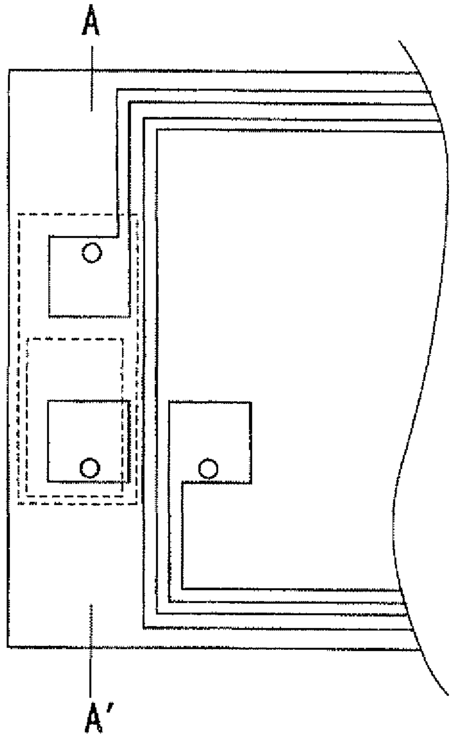
FIG. 9 and FIG. 10 are plane views of the antenna apparatus according to Embodiment 2 of the invention.
Figure 10:
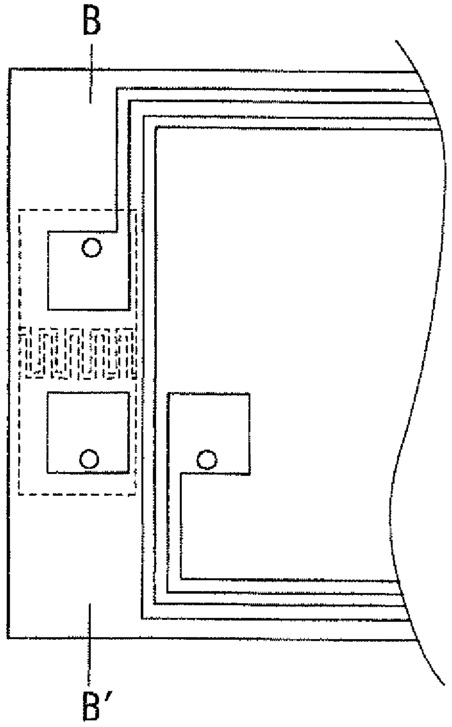
Figure 11:
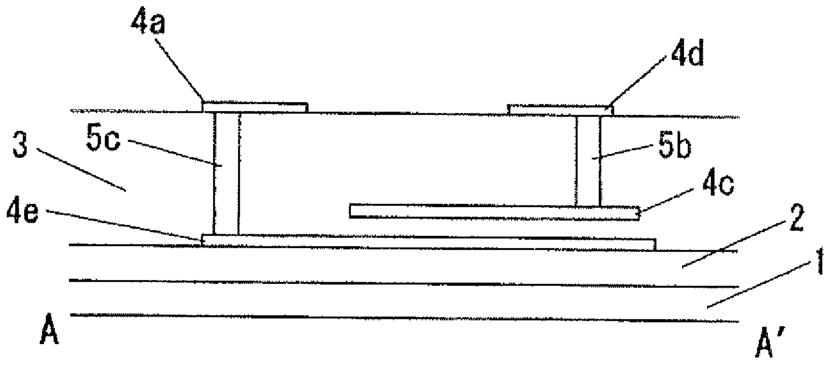
FIG. 11 and FIG. 12 are sectional views of the antenna apparatus according to Embodiment 2 of the invention.
Figure 12:
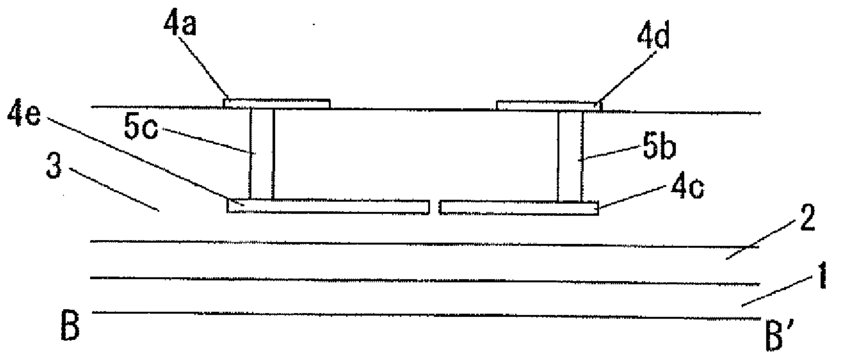

FIG. 4 is a plane view of an antenna apparatus according to Embodiment 2 of the invention, FIG. 5 through FIG. 7 are plane views of portions of the antenna apparatus according to Embodiment 2 of the invention, and FIG. 8 is a constitution view of a wireless communication medium processing apparatus according to Embodiment 2 of the invention. FIG. 9, FIG. 10 are plane views of the antenna apparatus according to Embodiment 2 of the invention. FIG. 11, FIG. 12 are sectional views of the antenna apparatus according to Embodiment 2 of the invention.

FIG. 4 through FIG. 8 show a case of using two of the antenna apparatus explained in Embodiment 1 and both of the antenna apparatus are loop antennas. Because there is a case in a wireless communication medium processing apparatus having two of an antenna apparatus for supplying power to a wireless communication medium of an IC card or the like and an antenna apparatus for executing data communication with a wireless communication medium. Naturally, the processings can also be carried out by a single antenna apparatus and therefore, a single one of the antenna apparatus will do.

FIG. 4 through FIG. 7 show a case of including two of antenna apparatus in either of the antenna apparatus, as explained in Embodiment 1, the magnetic member 3 is directly formed with the antenna 4 in a loop shape and the matching circuit to realize a thin type, durability and an increase in a magnetic field intensity for expanding a communication distance.

FIG. 4 shows a case of arranging the antenna apparatus 4 on the left and on the right.

On the other hand, FIG. 5 shows a case of arranging the antenna apparatus 4 on the upper side and on the lower side. When the antenna apparatus 4 are arranged on the left and on the right as shown by FIG. 4, end portions (electrodes) led out from the antenna apparatus 4 are arranged on the left and on the right, when the antenna apparatus 4 are arranged on the upper side and on the lower side as shown by FIG. 5, end portions of the antenna apparatus 4 are arranged on one side and therefore, it is preferable to properly use the antenna apparatus 4 in accordance with a structure or a specification of the wireless communication medium processing apparatus. Thereby, the antenna apparatus 4 can pertinently correspond to a specification of an apparatus.

Or, when there is an allowance in an arrangement of an inner circuit of the wireless communication medium processing apparatus, as shown by FIG. 6, FIG. 7, it is also preferable to form end portions of the antenna 4 at a surface of the magnetic member 3 and design without using the via hole 5.

Next, the matching circuit will be explained in reference to FIG. 9 through FIG. 12.

As explained in Embodiment 1, the matching circuit is necessary for the antenna 4. Particularly, as the matching circuit, a capacitance component is needed. FIG. 9 through FIG. 12 show a specific structure of generating the capacitance component.

First, an explanation will be given in reference to FIG. 9 and FIG. 11 as an example of a structure of generating a capacity component. FIG. 9 shows a plane state of a matching circuit portion, and FIG. 11 shows a sectional state thereof.

Notations 4*a* through 4*e* designate conductive members, notations 5*b*, 5*c* designate via holes and respectives thereof are formed at layers of the magnetic member 3 of the multilayer structure different from each other. A capacity component is generated by making the conductive members opposed to each other. As shown by FIG. 11, the capacity component can be provided since the magnetic member 3 interposed thereby is constituted by a dielectric member. A capacitance value is determined by a dielectric constant of the dielectric member interposed therebetween, an area of the conductive members opposed to each other and a distance between the conductive members opposed to each other and therefore, a desired capacitance value can be provided by changing these.

Further, as is apparent from a top view, one opposed electrode 4*c* is arranged on an inner side of other opposed electrode 4*e*, and even when positions of the opposed electrode 4*c* and the opposed electrode 4*e* relative to each other are more or less shifted within a variation of fabrication, so far as the opposed electrode 4*e* is not extruded to an outer side of the opposed electrode 4*c*, a stable and desired electrostatic capacitance can be achieved.

Next, other structure will be explained in reference to FIG. 10 and FIG. 12.

Although a capacitance is formed by a pair of opposed electrodes, it is not necessarily needed that the electrodes are opposed to each other with an area. As shown by FIG. 10 and FIG. 12, an electrostatic capacitance element can also be achieved by comb shape electrodes 4*c*, 4*e* formed on a same plane. In this case, in order to achieve a desired electrostatic capacitance, it is necessary that the comb shape electrodes 4*c*, 4*e* are sufficiently proximate to each other with regard to a distance therebetween and a boldness of a comb tooth is very slender and a length of opposed lines is sufficiently gained. By constituting the comb shape electrodes 4*c*, 4*e* by using a transcribing method having a high pattern accuracy, such comb shape electrodes 4*c*, 4*e* can be realized.

These are constituted in the magnetic member 3 and therefore, these are difficult to be effected with an external influence and less subjected to a change in a floating capacitance or the like and therefore, there is achieved an advantage of capable of constituting a stable and highly reliable matching circuit.

Finally, an explanation will be given of structures of a wireless communication medium processing apparatus 10 and a wireless communication medium 20 and communicating operation of the both in reference to FIG. 8.

FIG. 8 shows the wireless communication medium processing apparatus 10 and the wireless communication medium 20 and shows that a communication is executed between the wireless communication medium 20 and the wireless communication medium processing apparatus 10.

Numeral 10 designates the wireless communication medium processing apparatus which is a reader or a reader/writer or the like. Numeral 101 designates a control portion for executing a synchronizing processing and operating processing of a total of the apparatus. Numerals 105, 106 designate antenna apparatus, numeral 104 designates a power source portion, numeral 103 designates a modulating portion and numeral 102 designates a demodulating portion.

Numeral 20 designates the wireless communication medium, numeral 201 designates a control portion, numeral 202 designates a demodulating portion, numeral 203 designates a modulating portion, numeral 204 designates a power source portion, numeral 205 designates an antenna, numeral 206 designates a matching circuit which comprises at least one capacitor and numeral 207 designates a switch.

In the wireless communication medium processing apparatus 10, the modulating portion 103, the demodulating portion 102, the control portion 101 constitute a reading/writing portion for executing, writing, reading/writing of data between the wireless communication medium processing apparatus 10 and the wireless communication medium 20 via the antenna apparatus 105, 106.

Although not particularly shown in FIG. 8, in the wireless communication medium 20, there is present a cabinet for storing the antenna apparatus and a processing circuit of IC or the like and also in the wireless communication medium processing apparatus 10, a cabinet is present.

Further, in FIG. 8, power is supplied to the wireless communication medium 20 via the antenna apparatus 105, data is transmitted, data from the wireless communication medium 20 is received via the antenna apparatus 106, received data is demodulated at the demodulating portion 102, and an ID code provided to the wireless communication medium 20 is determined.

Further, as has been explained in Embodiment 1, the antenna apparatus 105, 106 are formed with the antenna 4 and the matching circuit 206 directly at the magnetic member, thin type and small-sized formation are realized, in addition, the magnetic field intensity is increased by the flexible magnetic member to expand the communication distance and durability against destruction or damage is promoted.

Therefore, the wireless communication medium processing apparatus 10 and the wireless communication medium 20 shown in FIG. 8 can be made to be very small-sized and thin type, the communication distance of the both members can be prolonged and durability in fabricating, in transporting, and in using can be promoted.

As described above, by the wireless communication medium 20 and the wireless communication medium processing apparatus 10 integrated with the antenna apparatus explained in Embodiment 1, communication is realized therebetween.

As described above, when the antenna apparatus formed with the antenna 4 and the matching circuit 206 directly at the magnetic member explained in Embodiment 1 is applied to the wireless communication medium and the wireless communication medium processing apparatus, thin type formation, small-sized formation can be realized, expansion of the communication distance by increasing the magnetic field intensity is realized, and since the magnetic member is flexible, the wireless communication medium and the wireless communication medium processing apparatus having high durability against destruction or damage can be realized.

(Embodiment 3)

Figure 13:
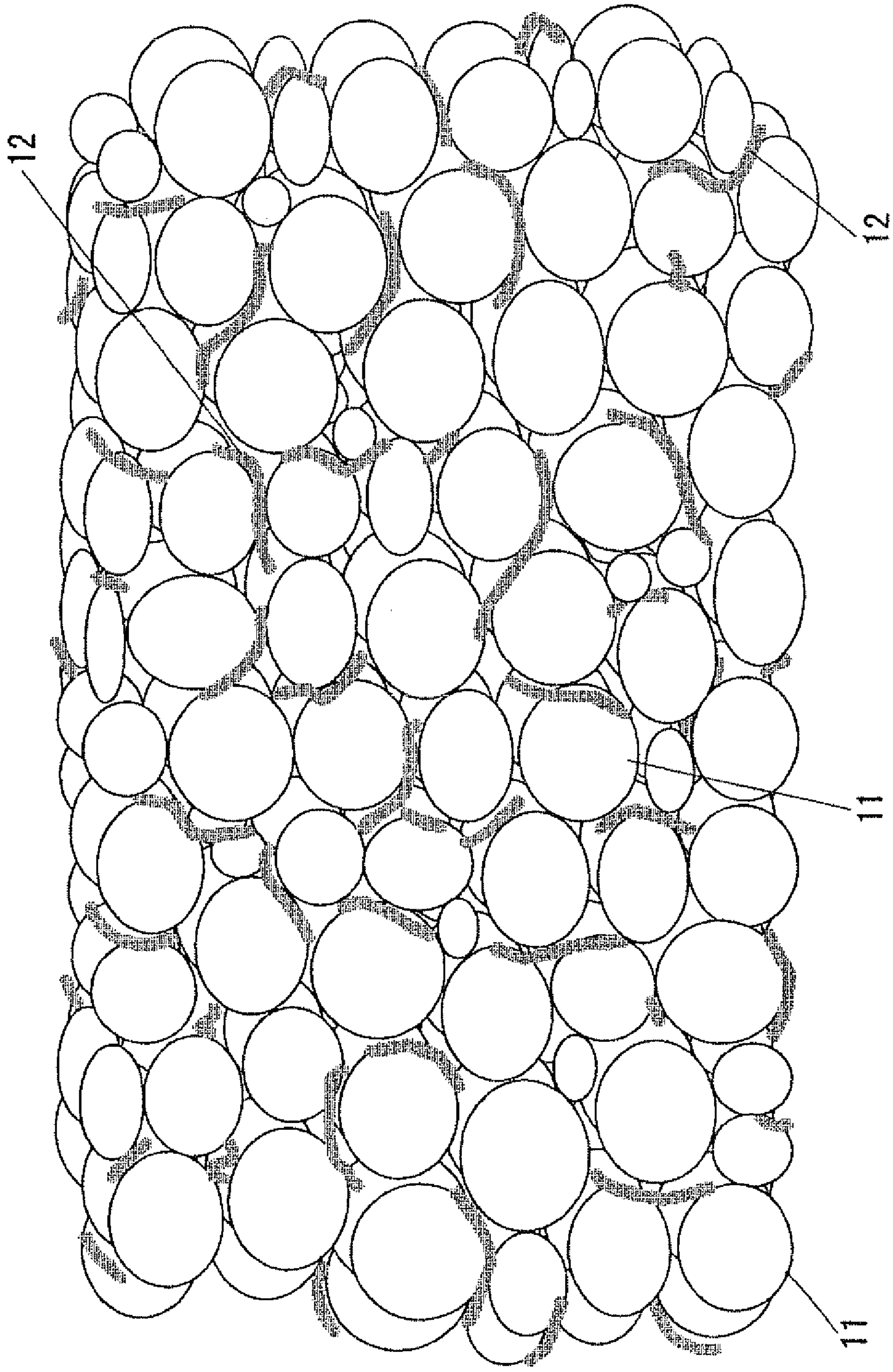
FIG. 13 is a sectional view of a magnetic sheet structure according to the embodiment of the invention.

FIG. 13 is a sectional view of a magnetic sheet structure according to the embodiment of the invention. Numeral 11 designates a magnetic ceramic powder, and numeral 12 designates a film for bonding respective magnetic ceramic powders. First, the magnetic ceramic powder 11 will be explained.

The magnetic ceramic powder 11 comprises Ni—Zn species ferrite or Mn—Zn species ferrite, Ni—Zn species ferrite is specifically constituted by composition ratios of 48.5 mol % of $Fe_2O_3$, 20.55 mol % of ZnO, 20.55 mol % of NiO, and 10.40 mol % of CuO and an average particle size of the magnetic ceramic powder is from 1.5 μm to 2.0 μm.

Next, the film 12 will be explained. The film 12 is formed on the surface of the magnetic ceramic powder 11 for bonding respectives of the magnetic powders 11. A film 12 is formed by butyral resin and a phthalic acid species plasticizer.

A green sheet comprising the magnetic member having the above-described constitution is formed as follows.

First, 55 wt % of the magnetic powder having the above-described composition, 20 wt % of a mixture solution of butyl acetate and 2 butoxy ethanol, and 25 wt % of a vehicle dissolved with 8 wt % of butyral resin, 6.5 wt % of phthalic acid species plasticizer in a mixture solution of butyral acetate and 2 butoxy ethanol are mixed for 24 hours by a ball mill to form a slurry solution of the magnetic powder. After removing air bubbles in the slurry solution by removing bubbles of the slurry solution in vacuum, the slurry is continuously coated on a PET film by using a doctor blade method and a sheet having a thickness of 0.1 mm is formed while drying the slurry at temperatures from 85° C. to 95° C.

Next, after cutting the sheet in a predetermined dimension, the PET film is exfoliated and only 40 sheets of the sheets are laminated. Thereafter, the sheets are pressed to form by a pressure of 150 kg per square cm by a press machine heated to 40° C., the magnetic sheet having a thickness of 3.2 mm is formed.

Then, first, a Q value of the magnetic sheet is measured by 4191 ARF impedance analyzer made by HP. The Q value is measured by working the magnetic sheet in a shape of a circular plate having a diameter of 2.5 cm and an inner diameter of 1.3 cm and passing a lead wire having a diameter of 0.5 mm through the circular plate. A result of the measurement is shown in (Table 1).

TABLE 1

| | Q value (13.56 MHz) | shape | |
|---|---|---|---|
| Embodiment | 8 | diameter | 2.5 cm |
| | | inner diameter | 1.3 cm |
| | | thickness | 3.2 mm |
| Comparative Example | 5 | diameter | 2.5 cm |
| | | inner diameter | 1.3 cm |
| | | thickness | 3.2 mm |

It is known from the result that the Q value at frequency of 13.56 MHz is 5 which is superior to that of a comparative example. According to the comparative example, only the composition of the magnetic ceramic powder is changed and other conditions are made to be the same. Powder composition ratios are constituted by 48 mol % of $Fe_2O_3$, 42 mol % of NiO and 10 mol % of CuO.

Next, a surface resistivity, a bulk density and a surface roughness of the green sheet is measured to be $8\times10^{11}\Omega$, 3.3 g/cm$^3$, 0.3 μm. It is known from the values that a matching circuit, a circuit pattern or the like can be integrated on the green sheet.

Hence, a circuit pattern is formed on the green sheet.

First, 3 sheets of sheets of 0.1 mm are laminated. Next, a silver conductor pattern of a length of 100 mm, a width of 3 mm and a thickness of 0.04 mm is transcribed on the sheet by a plating transcribing method. Next, 3 sheets of the sheets of 0.1 mm are further laminated on the sheet transcribed with the conductor. Further, the sheets are pressed to form by a pressure of 150 kg per square cm by a press machine heated to 40° C. to form a green sheet of a thickness of 0.48 mm in which the silver conductor is formed. Further, when a resistance value of the silver conductor in the magnetic sheet is measured, a low resistance value of 0.03Ω is shown and it is known also therefrom that a matching circuit or a circuit pattern can he integrated thereto.

Here, when the surface resistivity of the green sheet is equal to or smaller than $1\times10^{8}\Omega$, in a case in which an interval between lines of a circuit pattern is narrow, there poses a problem that the circuit pattern is shortcircuited, which is not preferable.

Further, the bulk density of the green sheet is preferably equal to or larger than 2.3 g/cm$^3$. When the bulk density is equal to or smaller than 2.3 g/cm$^3$, the magnetic property is not stabilized, further, the green sheet per se is liable to adsorb humidity, when the circuit pattern is formed at inside thereof, there poses a problem that patterns are shortcircuited, which is not preferable.

Further, the surface roughness of the green sheet is preferably equal to or smaller than 10 μm. When the surface roughness is equal to or larger than 10 μm, a conductor is disconnected, a gap is produced between the green sheet and the conductor, the circuit pattern cannot be formed accurately and therefore, the value is not preferable.

Further, although according to the embodiment, a plurality of sheets of comparatively thin green sheets of the same kind are laminated, depending on an object thereof, several kinds of magnetic members having different weight blending rates of a magnetic ceramic powder, butyral resin and a phthalic acid species plasticizer may be laminated to constitute the green sheet.

Figure 14:
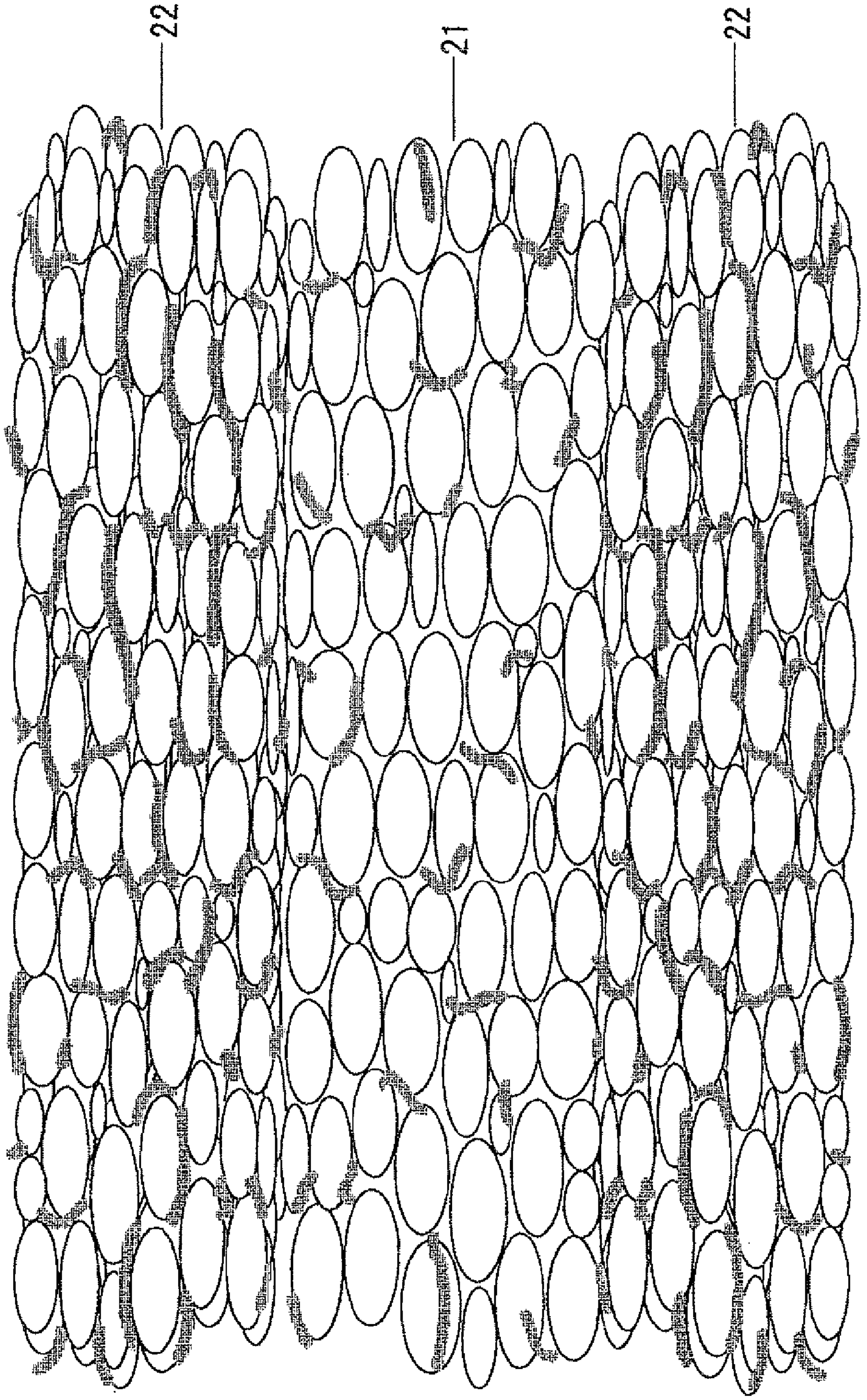
FIG. 14 shows a sectional view of a magnetic sheet constituted by laminating and pressing several kinds of sheets having different weight blending rates according to an embodiment of the invention.

FIG. 14 shows a sectional view of a magnetic sheet constituted by laminating and pressing several kinds of sheets having different weight blending rates according to an embodiment of the invention.

Numeral 21 designates a magnetic member. Numeral 22 designates a green sheet and the magnetic member comprises a magnetic ceramic powder and butyral resin.

First, 3 sheets of green sheets of a thickness of 0.1 mm of the above-described embodiment are laminated, next, one sheet of a magnetic member of a thickness of 0.5 mm comprising only a magnetic powder and butyral resin is laminated. Next, 3 sheets of green sheets of a thickness of 0.1 mm of the embodiment are laminated and pressed to form by a pressure of 150 kg per square cm by a press machine heated to 40° C. to form a green sheet of 0.8 mm.

According to the green sheet fabricated in this way, a content of the plasticizer is small as a whole and therefore, there is achieved an effect of being difficult to bring about a change in a weight and an aging change in a shape.

Further, although according to the embodiment, the laminated sheets are pressed to form by a comparatively low pressure of 150 kg per square cm, this is because the sheet is excellent in compression formability. A compression rate of from 10% to 40% is achieved by pressing to form the green sheet by selecting an optimum particle size of the magnetic ceramic powder and an optimum rate of blending butyral resin and a phthalic species plasticizer, as a result, the dense green sheet can be formed. When the compression rate of the green sheet is equal to or smaller than 10%, an insufficiently dense green sheet having a poor packing rate is provided and therefore, the value is not preferable. At the compression rate equal to or larger than 40%, a rate of changing a thickness is excessively large, a dimensional accuracy is deteriorated, and a large amount of the sheet material is needed, which is unecomonical.

Further, the green sheet formed by the embodiment is provided with a pertinent flexibility and therefore, the sheet can easily be punched to form by punching or the like and therefore, the green sheet is also characterized in that a complicated shape thereof can be worked at low cost and can be formed by a large amount.

Further, the green sheet formed by the embodiment is easily dissolved to disperse in an organic solvent and is provided with adhering performance at a dissolved and dispersed portion thereof. Although the green sheet is insoluble to water, the green sheet is easy to dissolve in an organic solvent, a dissolved face thereof is provided with adhering performance and therefore, a tape or the like for pasting the green sheet is not needed and therefore, there is also achieved an effect of capable of forming a green sheet at low cost and thinning the thickness.

Next, by using an antenna apparatus for processing a wireless communication medium, the magnetic member according to the embodiment and a magnetic member kneaded to fix a metal magnetic powder of sendust, permalloy or the like by an organic bonding material are compared.

Figure 15:
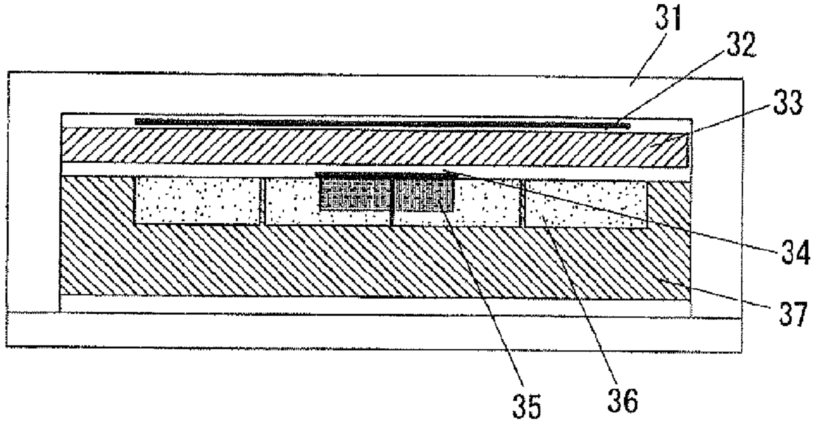
FIG. 15 shows a sectional view of an antenna unit of antenna apparatus for processing a wireless communication medium according to the embodiment of the invention.
Figure 16:
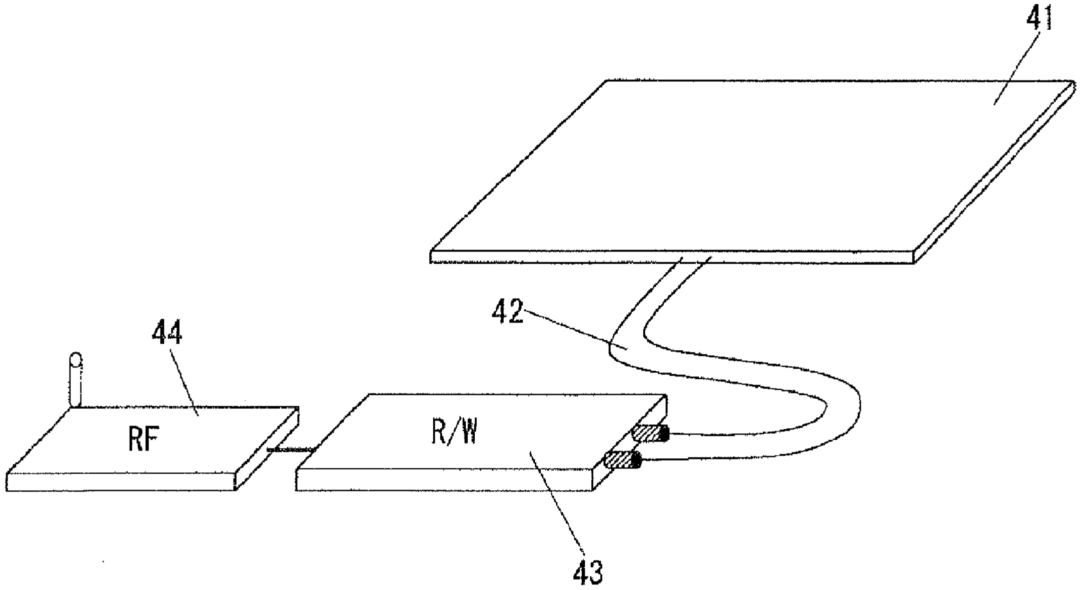
FIG. 16 shows a perspective view of the antenna unit of the antenna apparatus for processing a wireless communication medium according to the embodiment of the invention.

FIG. 15 shows a sectional view of an antenna unit of antenna apparatus for processing a wireless communication medium according to the embodiment of the invention, and FIG. 16 shows a perspective view of the antenna unit of the antenna apparatus for processing a wireless communication medium according to the embodiment of the invention. Numeral 31 designates a resin case, numeral 32 designates an antenna pattern, numeral 33 designates an antenna board, numeral 34 designates a GND pattern, numeral 35 designates a matching circuit and the like, numeral 36 designates a magnetic member, numeral 37 designates a resin spacer, numeral 41 designates an antenna unit, numeral 42 designates a cable, numeral 43 designates a reader/writer apparatus and numeral 44 designates an RF unit. Here, a shape of the magnetic member 36 is constituted by 180 mm×210 mm×3 mm, and the antenna pattern 32 is a loop antenna made of aluminum having a thickness of 2 mm and installed above the magnetic member via the board.

Here, an explanation will be given of actual generation of a magnetic flux from an antenna unit and an effect of a magnetic member when a metal is present at a bottom of the antenna unit.

Figure 17:
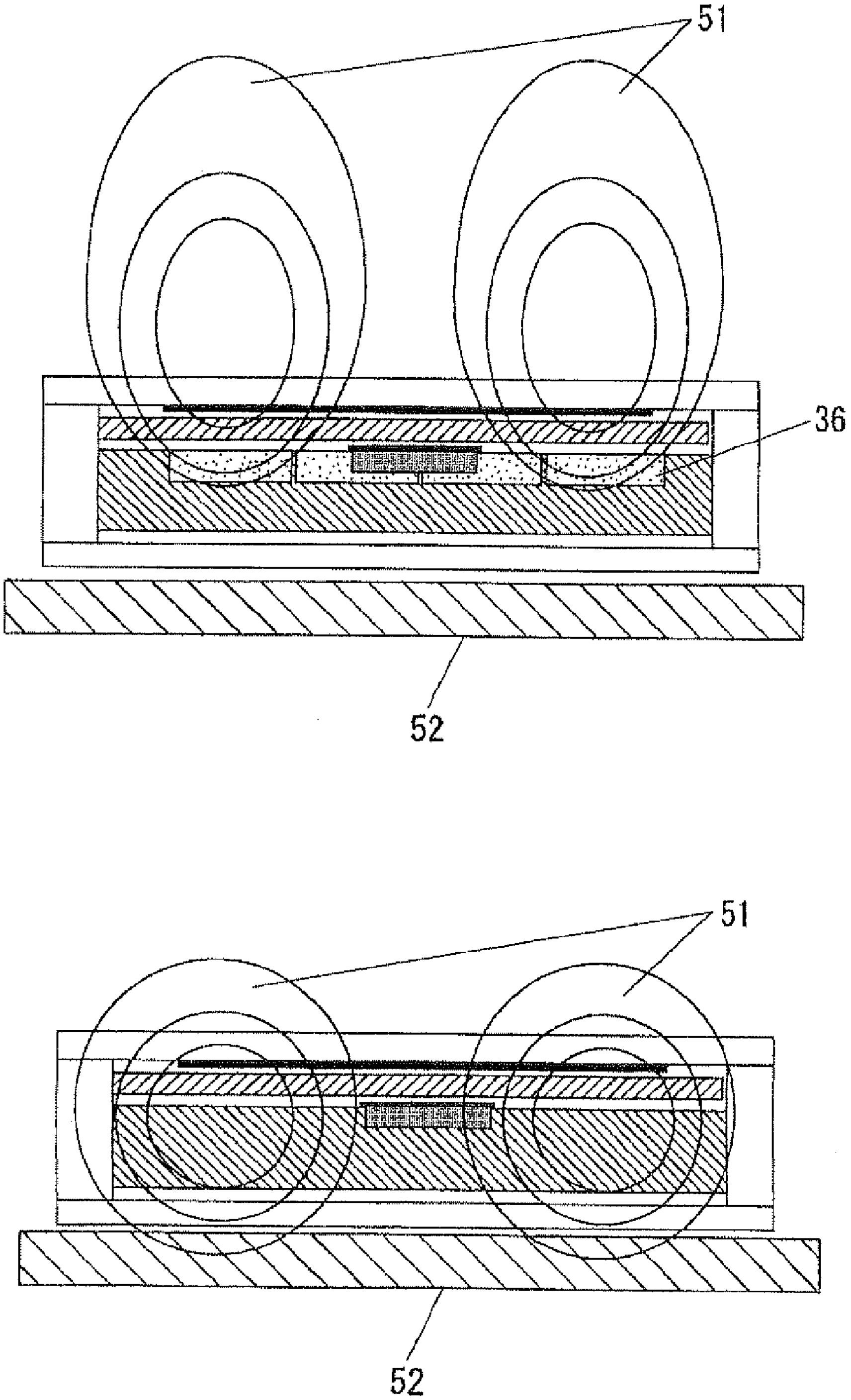
FIG. 17 shows a view of generating a magnetic flux in presence or absence of the magnetic member of the antenna apparatus for processing a wireless communication medium according to the embodiment of the invention.

FIG. 17 shows a view of generating a magnetic flux in presence or absence of the magnetic member of the antenna apparatus for processing a wireless communication medium according to the embodiment of the invention. Numeral 51 designates a magnetic flux and numeral 52 designates a metal member. When a signal is inputted to the antenna unit 41, the magnetic flux 51 is generated at a vicinity of the antenna. In this case, when the magnetic member 36 is installed at inside of the unit, the magnetic flux 51 is expanded without being influenced by the metal member 52 and a communication distance is prolonged. However, when the magnetic member 36 is not present at inside of the unit, an eddy current is generated at a surrounding of the magnetic flux 51 passing inside of the metal and is converted into heat and therefore, the magnetic flux is contracted and the communication distance is not prolonged. Therefore, it is very important to install the magnetic member at inside of the antenna unit and a magnetic property of the magnetic member controls expansion of the communication distance.

Hence, the communication distance by the magnetic member is measured by constituting an output of the antenna unit 41 by 2.5 W and using an IC tag as an example of a wireless communication medium. A result of the measurement is shown in (Table 2).

TABLE 2

| | communication distance (cm) |
|---|---|
| Embodiment Example | 35 |
| Comparative Example | 26 |

It is known from the table that according to the magnetic member of the embodiment, the communication distance is expanded up to 35 cm which is superior to that of a comparative example. This is because packing performance of the magnetic ceramic powder is excellent and the embodiment is formed by the dense magnetic member.

From the above-described, when the antenna apparatus for processing a wireless communication medium is utilized as a commodity shelf or a commodity basket, commodity control can pertinently be carried out.

For example, when a commodity is a drug or the like, in the case in which an IC tag attached to the commodity is previously set with a name, an expiration date, a delivery date or the like thereof and a box-like member 30 is utilized as a drug containing shelf, inventory control of the drug is facilitated, for example, a drug immediately before an expiration date is previously abandoned and it can be confirmed which drug remains by what degree by only containing the drug. Similarly, even when the commodity is constituted by a book, food product or the like, the same goes therewith. Therefore, there is achieved an advantage of very much increasing an efficiency of stocktaking or the like.

As described above, by working an unbaked magnetic member (i.e. green sheet) using a magnetic ceramic powder in a plate-like shape or a sheet-like shape or the like to constitute a mode of being made to be proximate or brought into contact with a position of a rear face, a bottom face, a side face or the like of an antenna integrated to a wireless communication medium starting from an IC tag or the like, or an antenna for communicating with the wireless communication medium, a magnetic field intensity can be intensified by avoiding influence of a metal at a surrounding more than a magnetic member using a metal magnetic powder of a related art and the communication distance can be prolonged. Furthermore, in comparison with a case of using ferrite or metal magnetic powder, a highly flexible magnetic member can be constituted and therefore, there can be formed an antenna unit which is difficult to be damaged in fabricating, transporting or using and is provided with high durability. Thereby, function and durability of a wireless communication medium and an apparatus of processing a wireless communication medium can simultaneously be promoted.

(Embodiment 4)

FIG. 13 is a sectional view of a magnetic member according to an embodiment of the invention. Numeral 11 designates a magnetic ceramic powder, and numeral 12 designates a film for respectively bonding the magnetic ceramic powders. First, the magnetic ceramic powder 11 will be explained.

The magnetic ceramic powder 11 comprises Ni—Zn species ferrite or Mn—Zn species ferrite which is tentatively baked for 4 hours in a range of from 750° C. to 900° C. and crushed and a mean particle size of the magnetic ceramic powder is from 0.8 μm to 1.3 μm.

Next, the film 12 for respectively bonding the magnetic ceramics powders will be explained. The film 12 for respectively bonding the magnetic ceramic powder is formed on a surface of the magnetic ceramic powder 11 for respectively bonding the magnetic ceramic powders 11. It is preferable to form a film for forming the film 12 for respectively bonding the magnetic ceramic powders by hydroxypropylmethyl cellulose or hydroxylethylmethyl cellulose species resin as a water soluble bonding material and sorbitan monocaprylate or glycerin species plasticizer as an oily plasticizer. The resin and the plasticizers are materials which are easy to handle and effective for preventing contamination of environment since an environment load substance or the like is not included therein.

Here, it is preferable to include 2 through 10 wt % of hydroxypropylmethyl cellulose or hydroxylethylmethyl cellulose species resin relative to the magnetic ceramic powder. When the value is equal to or smaller than 2 wt %, shape preserving performance cannot sufficiently be ensured and therefore, the value is not preferable. Further, when the value is equal to or larger than 10 wt %, the magnetic property of the magnetic member is deteriorated and therefore, the value is not preferable.

Here, it is preferable to include 3 through 15 wt % of sorbitan monocaprylate or glycerin species plasticizer relative to the magnetic ceramic powder. When the value is equal to or smaller than 3 wt %, the magnetic member cannot sufficiently be provided with flexibility and therefore, the value is not preferable. Further, when the value is equal to or larger than 15 wt %, a volatile component of the plasticizer from the magnetic powder is increased, an aging change is increased, which is not preferable.

A green sheet comprising the magnetic member having the above-described constitution is fabricated as follows.

First, 3000 g of the magnetic ceramic powder having the above-described composition, 135 g of metrose 60SH4000 (made by Sinetsu Kagaku Kougyou) as a water soluble bonding material, 170 g of ceramizol C-08 (made by Nihon Yushi) as an oily plasticizer, and 340 g of distilled water are mixed for 20 minutes by a mixer, and passed through 3 pieces rolls by 3 times to constitute a molding. The molding is preserved and aged for 96 hours at 5° C. and made to fabricate a sheet having a thickness of about 3 mm by a vacuum extruding apparatus.

Next, by passing the sheet at a surface of a drum type dryer at 95° C., a sheet is dried and cut into a predetermined dimension to form a magnetic sheet having a thickness of 3 mm. Then, first, a Q value of the magnetic sheet is measured by 4191ARF impedance analyzer made by HP. The Q value is measured by working the magnetic sheet in a shape of a circular plate having a diameter of 2.5 cm, and an inner diameter of 1.3 cm and passing a conductive wire having a diameter of 0.5 mm through the circular plate. A result of the measurement is similar to that in (Table 1).

It is known from the result that the Q value at frequency of 13.56 MHz is superior to that of a comparative example. According to the comparative example, only the composition of the magnetic ceramic powder is changed and other condition is made to stay to be the same. Powder composition ratios are constituted by 48 mol % of $Fe_2O_3$, 42 mol % of NiO and 10 mol % of CuO.

Next, a surface resistivity, a bulk density, and a surface roughness of the green sheet are measured to be $5\times10^9\Omega$, 3.3 $g/cm^3$, 0.6 μm. It is known from the values that a matching circuit, a circuit pattern or the like can be integrated on the green sheet.

Hence, a circuit pattern is formed on the green sheet.

First, a sheet of 0.3 mm is fabricated by extrusion. Next, a silver conductor pattern having a length of 100 mm, a width of 3 mm and a thickness of 0.04 mm is transcribed on the sheet by a plating transcribing method. Next, one sheet of the sheet of 0.3 mm is laminated on the sheet transcribed with the conductor. Further, the sheets are pressed to form by a pressure of 150 kg per square cm by a press machine heated at 40° C. to fabricate a green sheet in which the silver conductor having a thickness of 0.48 mm is constituted. Further, when a resistance value of the silver conductor in the magnetic sheet is measured, a low resistance value of 0.03 Ω is shown and it is known also therefrom that a matching circuit or a circuit pattern can be integrated thereto.

Further, the green sheet fabricated by the embodiment is provided with pertinent flexibility and therefore, the green sheet can easily be punched by punching or the like and therefore, the green sheet is characterized in that the green sheet having a complicated shape can be worked at low cost and by a large amount.

Further, the green sheet fabricated by the embodiment is easily dissolved to disperse in distilled water or ion-exchanged water and is provided with adhering performance at a dissolved and dispersed portion. Hence, a dissolved face thereof is provided with adhering performance and therefore, a tape or the like for pasting the green sheet is not needed and therefore, there is also achieved an effect of capable of fabricating the green sheet at low cost and thinning in a thickness thereof.

Further, by forming a silicone film at a surface or a portion of the green sheet fabricated by the embodiment, weather resistance can further be promoted. By spraying a mixture solution of 1 to 4 of a silicone solution SR2411 (made by Toyo Rayon) and a toluene solution to a surface of the green sheet and drying the mixture solution for 10 minutes at 50° C., the silicone film can easily be formed, a water repellent effect is achieved and therefore, the weather resistance can be promoted.

Next, by using an antenna apparatus for processing a wireless communication medium, the magnetic member of the embodiment and a magnetic member constituted by kneading to fix a metal magnetic powder of sendust, permalloy or the like by an organic bonding material are compared.

FIG. 15 shows a sectional view of antenna unit of an antenna apparatus for processing a wireless communication medium according to the embodiment of the invention, and FIG. 16 shows a perspective view of the antenna unit of the antenna apparatus for processing a wireless communication medium according to the embodiment of the invention. Numeral 31 designates a resin ease, numeral 32 designates an antenna pattern, numeral 33 designates an antenna board, numeral 34 designates a GND pattern, numeral 35 designates a matching circuit which comprises at least one capacitor and the like, numeral 36 designates a magnetic member, numeral 37 designates a resin spacer, numeral 41 designates an antenna unit, numeral 42 designates a cable, numeral 43 designates a reader/writer apparatus and numeral 44 designates an RF unit. Here, a shape of the magnetic member 36 is constituted by 180 mm×210 mm×3 mm, and has a plurality of blocks by constituting a major component thereof by the magnetic ceramic powder. The antenna pattern 32 is a loop antenna made of aluminum having a thickness of 2 mm and installed above the magnetic member via the board.

Here, an explanation will be given of actual generation of a magnetic flux from an antenna unit and an effect of a magnetic member when a metal is present at a bottom of the antenna unit.

FIG. 17 shows a view of generating a magnetic flux in presence or absence of the magnetic member of the antenna apparatus for processing a wireless communication medium according to the embodiment of the invention. Numeral 51 designates a magnetic flux and numeral 52 designates a metal member. When a signal is inputted to the antenna unit 41, the magnetic flux 51 is generated at a vicinity of the antenna. In this case, when the magnetic member 36 is installed at inside of the unit, the magnetic flux 51 is expanded without being influenced by the metal member 52 and a communication distance is prolonged. However, when the magnetic member 36 is not present at inside of the unit, an eddy current is generated at a surrounding of the magnetic flux 51 passing inside of the metal and is converted into heat and therefore, the magnetic flux is contracted and the communication distance is not prolonged. Therefore, it is very important to install the magnetic member at inside of the antenna unit and a magnetic property of the magnetic member controls expansion of the communication distance.

Hence, the communication distance by the magnetic member is measured by constituting an output of the antenna unit 41 by 2.5 W and using an IC tag as an example of a wireless communication medium. A result of the measurement is shown in (Table 3).

TABLE 3

| | communication distance (cm) |
|---|---|
| Embodiment Example | 35 |
| Comparative Example | 26 |

It is known from the (Table 3) that according to the magnetic member of the embodiment, the communication distance is expanded up to 35 cm which is superior to that of a comparative example. This is because packing performance of the magnetic ceramic powder is excellent and the embodiment is formed by the dense magnetic member.

From the above-described, when the antenna apparatus for processing a wireless communication medium is utilized as a commodity shelf or a commodity basket, commodity control can pertinently be carried out.

For example, when a commodity is a drug or the like, in the case in which an IC tag attached to the commodity is previously set with a name, an expiration date, a delivery date or the like thereof and a box-like member 30 is utilized as a drug containing shelf, inventory control of the drug is facilitated, for example, a drug immediately before an expiration date is previously abandoned and it can be confirmed which drug remains by what degree by only containing the drug. Similarly, even when the commodity is constituted by a book, food product or the like, the same goes therewith. Therefore, there is achieved an advantage of much increasing an efficiency of stocktaking or the like.

As described above, by working an unbaked magnetic member using a magnetic ceramic powder in a plate-like shape or a sheet-like shape or the like to constitute a mode of being made to be proximate or brought into contact with a position of a rear face, a bottom face, a side face or the like of an antenna integrated to a wireless communication medium starting from an IC tag or the like, or an antenna for communicating with the wireless communication medium, a magnetic field intensity can be intensified by avoiding influence of a metal at a surrounding more than a magnetic member using a metal magnetic powder of a related art and the communication distance can be prolonged. Furthermore, in comparison with a case of using ferrite or metal magnetic powder, a highly flexible magnetic member can be constituted and therefore, there can be formed an antenna unit which is difficult to be damaged in fabricating, transporting or using and is provided with high durability. Thereby, function and durability of a wireless communication medium and an apparatus of processing a wireless communication medium can simultaneously be promoted.

Further, by providing a metal member on an outer side of the magnetic member (at a position of interposing the magnetic member along with the antenna), the metal member serves as a shield to achieve an advantage of capable of preventing leakage of a magnetic field emitted from the antenna to the outer side. Thereby, the constitution is preferable when, for example, an exchange with only the wireless communication medium present only at the inner side of the antenna is intended to carry out.

Further, magnetic member 36 has been explained as the green sheet, it is not necessarily needed that the magnetic member 36 is constituted by the green sheet. The magnetic member 36 can be constituted by a plurality of blocks baked by constituting a major component thereof by the magnetic ceramic powder.

(Embodiment 5)

Figure 18:
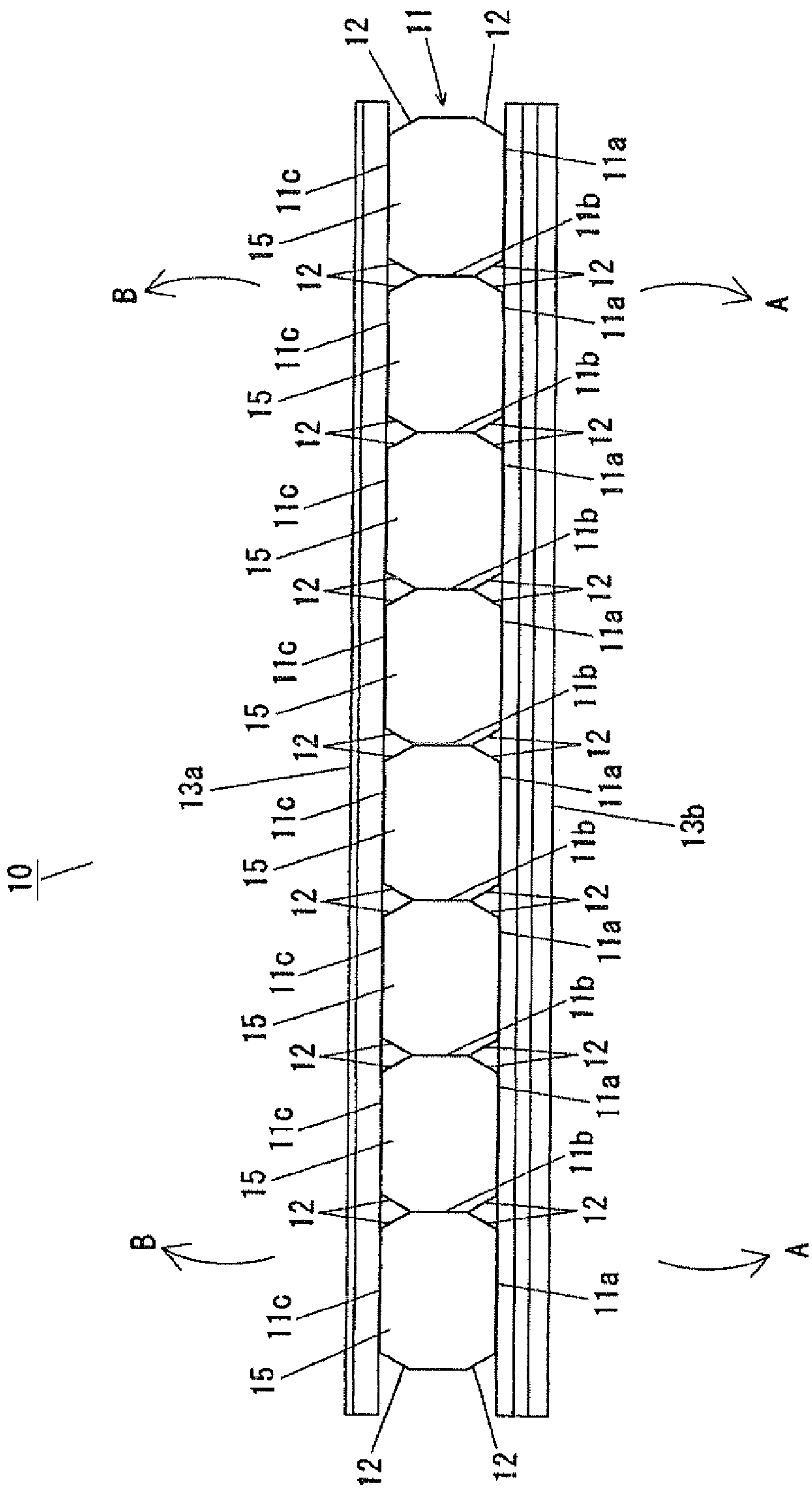
FIG. 18 is a sectional view of a ceramic sheet according to an embodiment of the invention.

FIG. 18 is a sectional view of a ceramic sheet 10 according to an embodiment of the invention. The ceramic sheet 10 includes sheets 13*a*, 13*b*, and a magnetic member (ceramic member) 11. The magnetic member 11 comprises a ceramics species material of ferrite or the like, mentioned later.

The sheets 13*a*, 13*b* are formed by a flexible material and comprises, for example, a plastic of PET (polyethyleneterephthalate). A sheet material of PET species is a material which is easy to handle and is effective for preventing contamination of environment since an environment load substance or the like is not included. Further, the sheets 13*a*, 13*b* can also be constituted by a plastic having transparency or light blocking performance or a combination of these. Thereby, the magnetic member 11 or a conductive member (mentioned later) formed on the magnetic member 11 can be protected against ultraviolet ray and long time reliability can be promoted.

The magnetic member 11 includes a plurality of blocks (hereinafter, referred to as "magnetic block") 15 and is formed in a rectangular parallelepiped. Although the magnetic block 15 comprises a ceramics species material as described above, the magnetic block 15 may not necessarily be constituted only by a ceramic material, for example, the magnetic block 15 may be coated by a predetermined material. The respective magnetic blocks 15 are pinched between the upper sheet 13*a* and the lower sheet 13*b* and mounted on the lower sheet 13*b* contiguously to each other. Each magnetic block 15 includes a bottom face (contact face) 11*a* brought into contact with the lower sheet 13*b*, a side face (opposed face) 11*b* brought into contact with other magnetic block 15 contiguous thereto and a ceiling face (other contact face) 11*c* brought into contact with the upper sheet 13*a*. The magnetic block 15 is pasted to the sheets 13*a*, 13*b* via an adhering material of acrylic species. The adhering material of acrylic species is a material which is effective for preventing contamination of environment since an environment load substance or the like is not included therein similar to the above-described sheet member.

Each magnetic block 15 includes a taper face (noncontact face) 12 which is not brought into contact with other magnetic block 15 contiguous thereto between the bottom face 11*a* and the side face 11*b*. Further, each magnetic block 15 includes a taper face (other noncontact face) 12 which is not brought into contact with other magnetic block 15 contiguous thereto between the ceiling face 11*c* and the side face 11*b*. Further, although. FIG. 18 shows a case in which all of the magnetic blocks 15 are in the same shape, only portions of the magnetic blocks 15 may include the above-described taper faces 12.

According to the constitution, when the ceramic sheet 10 is bent in an arrow mark A direction shown in FIG. 18, stresses are produced between the bottom face 11*a* and the side face 11*b* of the magnetic blocks 15 contiguous to each other, however, since the taper face 12 is provided between the bottom face 11*a* and the side face 11*b* as described above, the above-described stresses can be prevented from being concentrated on corners of the magnetic blocks 15. Thereby, even when the ceramic sheet 10 undergoes external stresses or impact, stresses produced at the magnetic block 15 can be dispersed and therefore, the magnetic block 15 can easily be prevented from being destructed. As a result, the magnetic block 15 can be prevented from being cracked or chipped and therefore, impact resistance and durability can be promoted while ensuring flexibility of the ceramic sheet 10. Further, by making the magnetic block 15 difficult to crack, workability can be promoted and a reduction in fabrication cost can be achieved.

On the other hand, when the ceramic sheet 10 is bent in an arrow mark B direction shown in FIG. 18, although stresses are produced between the ceiling faces 11*c* and the side faces 11*b* of the magnetic blocks 15 contiguous to each other similar to the above-described, the taper faces 12 are provided between the ceiling faces 11*c* and the side faces 11*b* as described above and therefore, the stresses can be prevented from being concentrated on corners of the magnetic blocks 15.

In this way, since the plurality of magnetic blocks 15 are mounted by being held between two sheets of the sheets 13*a*, 13*b*, even when the ceramic sheet 10 is bent, the respective magnetic blocks 15 can stably be mounted on the sheet 13*b* and flexibility of the ceramic sheet 10 can be promoted. Further, since the magnetic blocks 15 are not exposed to outside, the plurality of magnetic blocks 15 can be protected against external stresses, impact or the like.

Further, since the sheet comprising the adhering material and the plastic is provided with the flexibility, when the ceramic sheet is bent, stresses produced at the blocks can be escaped to the sheets via the adhering material. Thereby, while further promoting flexibility of the ceramic sheet, at the same time, impact resistance and durability can further be promoted.

Further, it is preferable that the taper face 12 occupies 15 through 90% in view of the face in a thickness direction. When the value is equal to or smaller than 15%, the value is insufficient for preventing crack, fracture, chipping or the like against the external stresses or impact, and when the value is equal to or larger than 90%, it is necessary to make both blades of a cutter for forming a slit (mentioned later) cut deeply thereinto and the baked member is damaged considerably, which is not preferable.

Further, although as the shape of the magnetic block 15, a case of the rectangular parallelepiped is shown, it is not necessary that the shape is particularly limited thereto. For example, the shape may be constituted by a polygonal cylinder a bottom face of which is substantially triangle, substantially quadrangle or the like, substantially a circular cylinder, substantially a sphere or the like. Further, although in FIG. 18, there is shown a case of bringing the magnetic blocks 15 into contact with each other via the side face 11*b*, it is not necessarily needed that the magnetic blocks 15 are brought into contact with each other. For example, even when the side faces 11*b* of the magnetic blocks 15 are opposed each other via a predetermined gap therebetween, in bending the ceramic sheet 10, similar to the above-described, stresses can be prevented from being concentrated on corners of the magnetic blocks 15.

Figure 19:
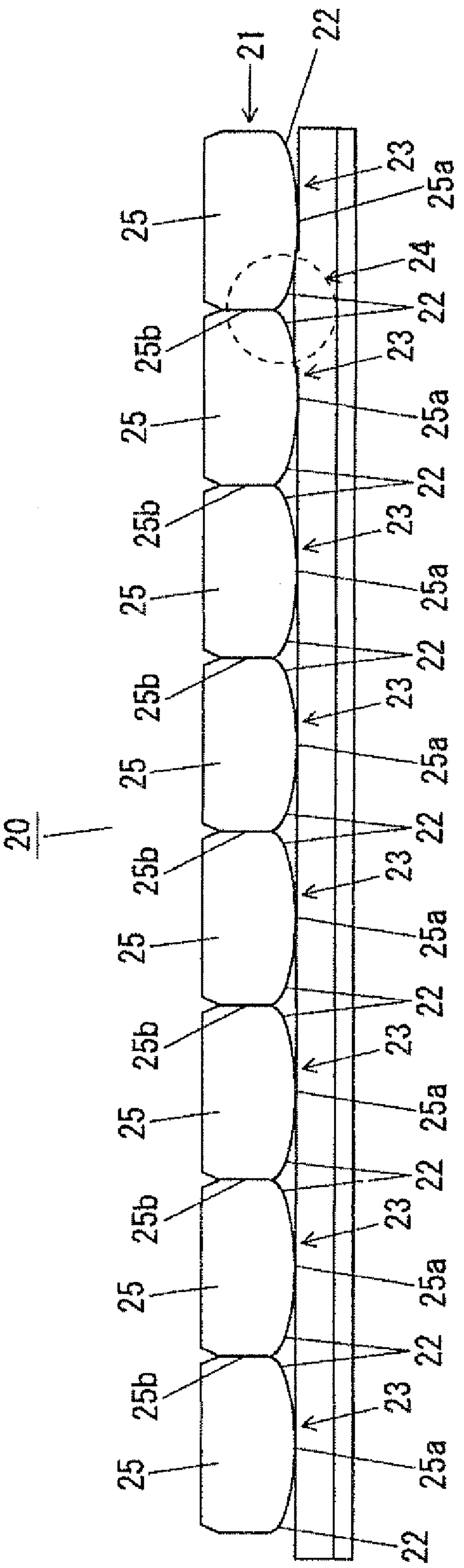
FIG. 19 is a sectional view of a ceramic sheet according other modified example of the invention.

FIG. 19 is a sectional view of a ceramic sheet 20 according other modified example of the invention. The ceramic sheet 20 includes a sheet 13*c* and a magnetic member 21. Although the ceramic sheet 20 of FIG. 19 differs from that of FIG. 18, in that the ceramic sheet 20 is not provided with a shape of the magnetic block 15 and the upper sheet 13*a*, other constitution thereof stays the same. Therefore, an explanation of the constitution which has already been explained will be omitted.

The magnetic member 21 includes a plurality of magnetic blocks 25 which are mounted on the lower sheet 13*c* contiguously to each other. Similar to the magnetic block 15 of FIG. 18, each magnetic block 25 is provided with a curved face (noncontact face) 22 which is not brought into contact with other magnetic block 25 contiguous thereto between a bottom face (contact face) 25*a* and a side face (opposed face) 25*b* and the curved face 22 is not a linear taper face but a curved face 23 continuous from the bottom face 25*a*. That is, at a region 24 indicated by a broken line in FIG. 19, a strength of bringing the magnetic member 21 and the sheet 13*c* into close contact with each other is smaller than that of a portion other than the region 24.

In this way, by proving the curved face 23 to each magnetic block 25 brought into contact the lower sheet 13*c*, the noncontact face 22 is formed by a shape smoothly continuous to the bottom face 25*a* and therefore, when the ceramic sheet 10 is bent, stresses produced at the magnetic block 25 can further be dispersed.

Further, it is preferable that an area of a portion of the bottom face 25*a* of the magnetic block 25 having a small adhering strength is 10% through 60% of an area of the bottom face 25*a*. When the value is equal to or smaller than 30%, the flexibility is insufficient, which is not preferable. When the value is equal to or larger than 60%, the area of the portion having the small adhering strength is excessively increased and reliability is deteriorated, which is not preferable.

Next, the magnetic members 11, 21 will be explained in details.

The magnetic members 11, 21 comprise ferrite. As ferrite, there is Ni—Zn (nickel-zinc) or Mn—Zn (manganese-zinc) species ferrite or the like. By using such ferrite, a stable magnetic property can be achieved.

In Ni—Zn species ferrite, there is, for example, $Fe_2O_3$.ZnO.NiO.CuO and in Mn—Zn species ferrite, there is, for example, $Fe_2O_3$.ZnO.NiO.CuO. By using such ferrite, as mentioned later, the Q value of antenna can be promoted and the communication distance can be expanded. According to Ni—Zn species ferrite, specifically, $Fe_2O_3$ is bended by a composition ratio of 48.5 mol %, ZnO is bended by a composition ratio of 20.55 mol %, NiO is bended by a composition ratio of 20.55 mol %, CuO is bended by a composition ratio of 10.40 mol %, and baked for 4 hours at 750° C. through 900° C.

Further, although the magnetic properties 11, 21 have been explained as pluralities of blocks constituting the ceramic sheets, it is not necessarily needed that the magnetic members are constituted by magnetic bodies. The magnetic bodies are used in a communication system of an electromagnetic induction type using a frequency band of, for example, 13,56 MHz. When the communication system is a microwave system using a frequency band equal to or higher than 800 MHz (for example, 900 MHz band), as the plurality of blocks, dielectric bodies are used.

As the dielectric body, for example a Ti (titanium) oxide is used. By using the dielectric body, the microwave characteristic can be promoted and since the dielectric constant is comparatively increased, an antenna shape can be reduced.

As Ti oxides, for example, there are Ba—Ti species ceramic, Ca—Ti species ceramic, and Mg—Ti species ceramic. By using the Ti oxides, the microwave characteristic can further be promoted. Further, as other oxides, there are Ba—Zn—Ti species ceramic, Ba—Nb—Ti species ceramic, Ba—Sm—Ti species ceramic, and Ba—Mg—Ti species ceramic. By using the Ti oxides, the microwave characteristic can be promoted such that a temperature characteristic of a dielectric constant is stabilized and antenna loss is reduced.

Such magnetic members 11, 21, for example, are fabricated as follows.

First, 3000 g of the magnetic ceramic powder having the above-described composition ratios, 135 g of metrose (for example, commodity name: 60SH4000, made by Sinetsu Kagaku Kougyou [registered trade mark]) as a water soluble bonding material, 270 g of ceramizol (for example, commodity name: C-08, made by Nihon Yushi) as oily plasticizer, and 340 g of distilled water are mixed for 20 minutes by a mixer. Next, by passing the mixture through 3 pieces rolls by 3 times to produce a molding. After aging the molding by preserving the molding for 96 hours at 5° C., a green sheet having a thickness of about 3 mm is fabricated by a vacuum extruding apparatus.

A surface of the green sheet is dried by passing the surface through a drum type dryer at 95° C. and cut into a predetermined dimension to fabricate a green sheet having a thickness of 2.8 mm. A baked member having a thickness of 2.5 mm is fabricated by baking the fabricated green sheet for 3 hours at 900° C. Here, the Q value of the baked member is measured by an impedance analyzer (commodity name: 4191ARF made by HP [registered trade mark]). The Q value at frequency of 13.56 MHz is measured by working the baked member in a shape of a circular disk having a diameter of 2.5 cm and an inner diameter of 1.3 cm and passing a conductive wire having a diameter of 0.5 mm through the circular disk. (Table 4) shows a result of measuring the Q value at frequency of 13.56 MHz.

TABLE 4

| | Q value (13.56 MHz) | shape | |
|---|---|---|---|
| Embodiment | 160 | diameter | 0.25 cm |
| | | inner diameter | 1.3 cm |
| | | thickness | 3.2 cm |
| Comparative Example | 90 | diameter | 0.25 cm |
| | | inner diameter | 1.3 cm |
| | | thickness | 3.2 cm |

As shown by (Table 4), the Q value (160) of the baked member is larger than a Q value (90) of a comparative example constituting an example of a related art and therefore, it is known that the Q value is superior to that of the comparative example. FIG. 13 shows the magnetic member constituting the comparative example. FIG. 13 is a view enlarging inside of the magnetic member constituting the related art. The magnetic member is constituted by kneading to fix a metal magnetic powder 11 of sendust, permalloy or the like by an organic bonding material 12.

When a surface resistance value, a bulk density, a surface roughness of the baked member are measured to be $5\times10^{11}\Omega$, 5.1 g/cm$^3$, 2.6 μm. Since the surface resistance value of the baked member is $5\times10^{11}\Omega$ which is larger than $1\times10^{8}\Omega$, it is known that various circuit patterns of a matching circuit and the like can be integrated on the baked member. When the surface resistance value of the baked member is equal to or smaller than $1\times10^{8}\Omega$, when an interval between lines of a circuit pattern is narrow, there poses a problem that the lines are shortcircuited, which is not preferable.

Further, since the bulk density of the baked member is 5.1 g.cm$^3$ which is larger than 4.0 g/cm$^3$, the ceramic property can be stabilized and promoted. It is preferable that the bulk density of the baked member is equal to or larger than 4.0 g/cm$^3$. When the bulk density is equal to or smaller than 4.0g/cm3, the ceramic property is not stabilized, further, the baked member per se is easy to absorb humidity and when a circuit pattern is formed at inside thereof, there poses a problem that the patterns are shortcircuited, which is not preferable.

Further, since the surface roughness of the baked member is 2.6 μm and is smaller than 10 μm, various circuits of a matching circuit and the like can accurately be integrated. It is preferable that the surface roughness of the baked member is equal to or smaller than 10 μm. When the surface roughness is equal to or larger than 10 μm, a conductor is disconnected, a gap is produced between the green sheet and the conductor, the circuit pattern cannot be formed accurately and therefore, the value is not preferable.

Therefore, it is known from the measured values of the surface resistance value, the bulk density, the surface roughness of the baked member that a matching circuit or a circuit pattern or the like can be integrated onto the baked member.

Hence, a circuit pattern is formed on the baked member as a conductive member.

A green sheet of 0.3 mm is fabricated by extrusion and is baked for 4 hours at 900° C. Next, a silver conductor pattern having a length of 100 mm, a width of 3 mm and a thickness of 0.04 mm is printed on the baked member as a conductive member by a screen printing method and baked for 15 minutes at 600° C. Further, when a resistance value of the silver conductor on the baked member is measured, a low resistance value of 0.03Ω is shown. Further, the conductive member may be formed by a plating transcribing method or a metal foil press-contacting method other than printed by the screen printing method. By using the methods, the circuit can be formed accurately at low cost.

Next, the ceramic sheet according to the embodiment and the related art are compared by using an antenna apparatus for processing a wireless communication medium.

First, a green sheet of 100 mm×100 mm×0.3 mm thickness is fabricated by extrusion. Next, slits having a depth are cut such that taper faces are formed in view of a face in a thickness direction by pitches of vertically 2.5 mm and horizontally 2.5 mm by a die or a cutter blade having a both blades shape. The slits may be cut to both faces of the green sheet in order to prevent occurrence of crack, fracture, chipping against external stresses or impact. The green sheet cut with the slits is baked for 4 hours at 900° C. and is pasted to a sheet of PET species having an acrylic species adhering material. The shape of the slit may be any shape so far as the slit is formed in a shape of a groove and may be, for example, a V-like shape or a U-like shape.

The ceramic sheet fabricated in this way is used in an antenna apparatus for processing a wireless communication medium and a communication distance is measured. As a reader/writer, KU-G5423AMDA (ISO1569) is used, as an antenna, that of a spiral shape formed on a galaepo board is used and the ceramic sheet of 40 mm×27 mm is mounted on the galaepo board, a metal plate is further mounted on the ceramic sheet and the communication distance is measured. (Table 5) shows a result of measuring the communication distance at frequency of 13.56 MHz.

TABLE 5

| | communication distance (13.56 MHz) |
|---|---|
| Embodiment | 65 cm |
| Comparative Example | 50 cm |

It is known from the table that according to the ceramic sheet of the embodiment, the communication distance is expanded up to 65 cm and is superior to that of a comparative example. The comparative example is constituted by a ceramic sheet constituted by kneading to fix a metal magnetic powder of sendust, permalloy or the like by an organic bonding material. This is because the ceramic species baked member is excellent in the ceramic property and is formed by a dense ceramic member.

Next, the ceramic sheet of the embodiment and the above-described comparative example are compared with regard to flexibility. As a comparing method, respective compared pieces are folded to bend by 90 degrees and a change in the property is investigated by repeating to fold to bend the respective compared pieces. (Table 6) shows a result of comparison of a number of times of the test of folding to bend the respective compared pieces by 90 degrees.

TABLE 6

| | number of times of 90 degrees fold-to bend test |
|---|---|
| Embodiment | 52 times |
| Comparative Example | 24 times |

It is known from the table that the ceramic sheet according to the embodiment is more excellent in durability than the comparative example. This is because the flexibility is promoted by providing the taper faces at the magnetic blocks to prevent collision between the contiguous baked members, or proving the curved faces at the magnetic blocks brought into contact with the sheet.

Further, communication distances of the ceramic sheet according to the embodiment and the comparative example constituting the related art are compared by using an antenna apparatus for processing a wireless communication medium.

FIG. 15 is a sectional view of an antenna apparatus 40 for processing a wireless communication medium. Further, in FIG. 15, the sheets 13*a*, 13*b*, 13*e* are omitted. Numeral 31 designates a resin case, numeral 32 designates an antenna pattern, numeral 33 designates an antenna board, numeral 34 designates a GND pattern, numeral 35 designates a circuit pattern of a matching circuit which comprises at least one capacitor or the like, numeral 36 designates a magnetic member of a ceramic species material, and numeral 37 designates a resin spacer. The antenna apparatus 32 is provided with an opening portion (that is, formed with a loop antenna) and is provided above the magnetic member 36 as shown by FIG. 15. That is, the antenna apparatus 32 is made to be proximate to a plurality of magnetic blocks. Further, the antenna apparatus 32 can also be brought into contact with the plurality of magnetic blocks.

FIG. 16 is a perspective view of a wireless communication medium processing apparatus 1 provided with the antenna apparatus 41. As shown by FIG. 16, the wireless communication medium processing apparatus 1 is provided with the antenna apparatus 41, a reader/writer (R/W) apparatus 43, and an RF (Radio Frequency) unit 44. The antenna apparatus

41 is connected to the reader/writer apparatus 43 via a cable 42. The reader/writer apparatus 43 is connected to the RF unit 44 via a cable 45.

The reader/writer (R/W) apparatus 43 corresponds to a reading/writing portion to execute at least one of reading and writing of data stored in a wireless communication medium via the antenna apparatus 41 between the reader/writer (R/W) apparatus 43 and the wireless communication medium. The wireless communication medium is a medium capable of executing wireless communication at a proximate distance (for example, several cm through several m) and as a medium, there is, for example, an RF-ID (Radio Frequency-IDentification) tag, an IC tag, an electronic tag, an IC card or the like.

As a communication system, there is an electromagnetic induction system using a frequency band of, for example, 13.56 MHz, or a microwave system using a frequency band equal to or higher than, for example, 800 MHz (for example, 900 MHz band). In the case of the electromagnetic induction system, the magnetic members 11, 21 of the ceramic species material are constituted by magnetic bodies. In the case of the microwave system, the magnetic members 11, 21 of the ceramic species material are constituted by dielectric bodies.

Here, the shapes of the magnetic members 11, 21 of the ceramic species material are constituted by 180 mm×210 mm×3mm, and the slits having the depth of 1.5 mm are cut by the pitches of vertical 6 mm and horizontal 6 mm by a die or a cutter blade having a both blades shape such that the non-contact faces 12, 22 can be formed. The slits are cut to both faces of the green sheet and baked for 4 hours at 900° C. in order to prevent occurrence of crack, fracture, chipping or the like against the external stresses or impact. Further, the antenna pattern 32 is a loop antenna made of aluminum having a thickness of 2 mm and is installed above the magnetic member via a board.

Since the antenna pattern 32 forms a loop antenna, the antenna apparatus, the antenna pattern 32 can execute communication regardless of a position, a direction of the wireless communication medium. Further, it is not necessarily needed that a shape of the antenna is formed by the loop shape but the antenna may be formed in a spiral shape.

Next, an explanation will be given of generation of a magnetic flux of an antenna apparatus and an effect of the magnetic member when a metal is present at a bottom portion of the antenna apparatus.

FIG. 17 illustrates an explanatory view of a magnetic flux distribution generated at the antenna apparatus 41 according to the invention and an explanatory view of a magnetic flux distribution generated at an antenna apparatus 51 of the related art. Although both of the antenna apparatus 41, 51 are mounted on a metal member 52, different from the antenna apparatus 51 of the related art, the antenna apparatus 41 is installed with the ceramic sheet 10 at inside thereof. Further, the antenna apparatus 41, 51 are the same with regard to a constitution other than the ceramic sheet 10.

When a signal is inputted to the antenna apparatus 51 of the related art, an eddy current is generated at a surrounding of a magnetic flux 90 passing through the metal and is converted into heat and therefore, the magnetic flux 90 is contracted. On the other hand, when a signal is inputted to the antenna apparatus 41, although the magnetic flux 90 is generated at a vicinity of the antenna similar to the antenna apparatus 51, since the ceramic sheet 10 is installed at inside thereof, much of the magnetic flux 90 passes through the magnetic member of the ceramic sheet 10. As a result, an eddy current is hardly generated at inside of the metal member 52 and therefore, the magnetic flux 90 is expanded without being influenced by the metal member 52 and the communication distance is expanded. Further, an effect similar to the above-described is achieved also by the ceramic sheet 20.

Next, by constituting an output of the antenna apparatus 41 by 2.5 W and using an IC tag as an example of the wireless communication medium, the communication distance in using the above-described magnetic member is measured. (Table 7) shows a result of measuring the communication distance at frequency of 13.56 MHz.

TABLE 7

| | communication distance (13.56 MHz) |
|---|---|
| Embodiment | 35 cm |
| Comparative Example | 26 cm |

It is known from the table that according to the ceramic sheet of the embodiment, the communication distance is expanded up to 35 cm and is superior to the comparative example. This is because the ceramic sheet of the embodiment is formed by the dense magnetic member of the ceramic species material.

From the above-described, when the antenna apparatus 41 for processing a wireless communication medium is utilized as a commodity shelf or a commodity basket, commodity control can pertinently be carried out.

For example, when a commodity is a drug or the like, in the case in which an IC tag attached to the commodity is previously set with a name, an expiration date, a delivery date or the like thereof and a box-like member is utilized as a drug containing shelf, inventory control of the drug is facilitated, for example, a drug immediately before an expiration date is previously abandoned and it can be confirmed which drug remains by what degree by only containing the drug. Similarly, even when the commodity is constituted by a book, food product or the like, the same goes therewith. Therefore, there is achieved an advantage of much increasing an efficiency of stocktaking or the like.

In this way, by working an unbaked magnetic member using a magnetic powder of ceramics species in a plate-like shape or a sheet-like shape or the like to constitute a mode of being made to be proximate or brought into contact with a position of a rear face, a bottom face, a side face or the like of an antenna integrated to a wireless communication medium starting from an IC tag or the like, or an antenna for communicating with the wireless communication medium, a magnetic field intensity can be intensified by avoiding influence of a metal at a surrounding more than a magnetic member using a metal magnetic powder of a related art and the communication distance can be prolonged. Furthermore, in comparison with a case of using ferrite or metal magnetic powder, a highly flexible magnetic member can be constituted and therefore, there can be formed an antenna unit which is difficult to be damaged in fabricating, transporting or using and is provided with high durability. Thereby, function and durability of a wireless communication medium and an apparatus of processing a wireless communication medium can simultaneously be promoted.

Further, by providing the metal member on an outer side (at a position of interposing the magnetic member along with the antenna) of the magnetic member, the magnetic member serves as a shield to achieve an advantage of capable of preventing leakage of a magnetic field emitted from the antenna on the outer side. Thereby, the metal member is preferable, for example, when an exchange only with the wireless communication medium present only on the inner side of the antenna is intended to execute.

Next, a method of fabricating the ceramic sheet 20 of FIG. 19 will be explained in details with reference to FIGS. 20 and 21.

First, at first step, a magnetic body slurry constituted by kneading a vehicle dissolved with a resin of butyral or the like, a plasticizer of the phthalic acid species, and a solvent of butyl acetate and a ferrite ceramic powder of Ni, Zn, Cu species or the like constituting a ceramic powder is coated on an upper face of a carrier film of PET or the like by a sheet molding method of a doctor blade method or the like. Thereafter, a magnetic body slurry is continuously dried to form a ferrite green sheet having a width of 500 mm and a thickness of 0.3 mm on the carrier film having a thickness of 0.1 mm as shown in FIG. 21. Further, when the ceramic sheet is constituted by blocks of the dielectric body, the ferrite green sheet may be formed by, for example, a Ti oxide.

At a second step, slits 66 having 0.15 mm width are provided on the ferrite-based green sheet 100 by a cutter blade at an upper face of the ferrite-based green sheet having 200 mm long, 150 mm width, and 0.3 mm thickness by pitches of vertically 2.5 mm, horizontally 2.5 mm to form the noncontact faces 22.

Figure 20:
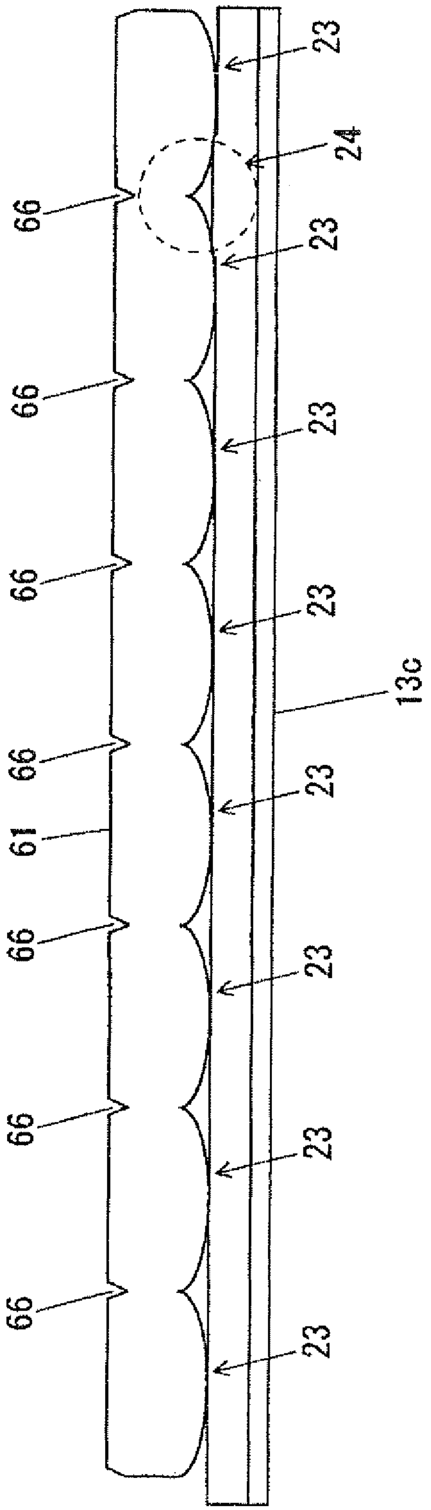
FIG. 20 is a sectional view showing the ceramic sheet comprising the baked body baked by providing the slits.
Figure 21:
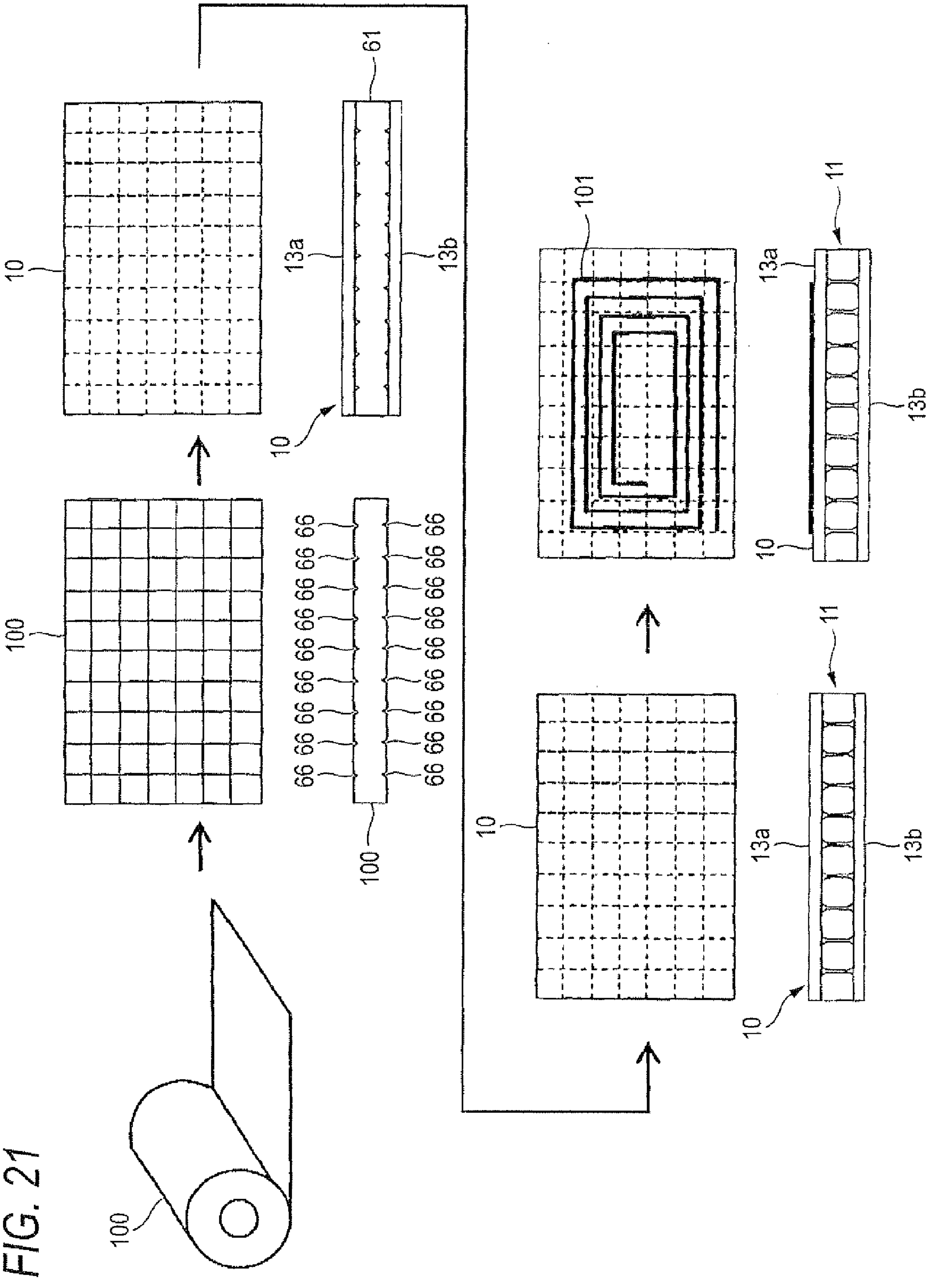
FIG. 21 is a diagram showing a producing method of the ceramic sheet comprising the baked body baked by providing the slits.

At a third step, the ferrite-based green sheet 100 provided with the slits 66 are baked for 3 hours at 900° C. on a smooth aluminum species board to form a baked body 61 shown in FIG. 20. FIG. 20 is a sectional view showing the ceramic sheet 20 comprising the baked body 61 baked by providing the slits 66. According to the green sheet, a vicinity of a portion thereof provided with the slit 66 is more shrunk than other portion by a baking reaction and therefore, a curved face 23 is formed at a face opposed to a face provided with the slit 66. Although as baking conditions, there is shown a case of 900° C.-3 hours, it is not necessary that the baking conditions are particularly limited thereto so far as the baking condition is 750° C. through 1000° C.-5 hours or shorter. Because whereas when the baking temperature is equal to or lower than 750° C., the ceramic green sheet is not completely baked, when the baking temperature is equal to or higher than 1100° C., brittleness of the baked body is deteriorated.

At a fourth step, the baked body 61 shown in FIG. 20 is adhered and held with the sheet 13_c_ of PET species having an acrylic species adhering material (commodity name: 9313B made by Sumitomo 3M [registered trade mark]) having a thickness of 0.06 mm at a face opposed to the slit face or at the both faces thereof. At the baked body 61 which has been baked, the face adhered to the sheet 13_a_, 13_b_ of PET species having the acrylic species adhering material is provided with the curved face and therefore, for example, in the ceramic sheet 10, 20, at the region 24 shown by broken line of FIG. 20, the strength of adhering the magnetic member 61 and the sheet 13_c_ is smaller than that at a portion other than the region 24.

At a fifth step, the baked body 61 is divided in a state of being mounted on the sheet 13_b_ to fabricate the ceramic sheets 10, 20 shown in FIG. 18 and FIG. 19 to be able to constitute flexibility. The sheet 13_b_ of PET species having the acrylic species adhering material is adhered onto the divided baked body 61 to hold the baked body such that the baked body is not detached therefrom. Additionally, the sheet 13_a_ is formed on the backed body 61 so as to hold the backed boy 61 by the sheets 13_a_ and 13_b_. Further, the sheet 13 of PET species having the acrylic species adhering material may be adhered thereto before dividing the baked body 61 to thereby provide a desired ceramic sheet.

From the above-described, by fabricating the ceramic sheet 20 by the above-described method, according to the green sheet, a vicinity of the portion provided with the slit 66 is shrunk more than other portion by a baking reaction and therefore, the noncontact face 22 at which the contiguous magnetic blocks 25 are not brought into contact with each other can easily be formed. Further, the baked body 61 is divided as being amounted on the sheet 13*c* and therefore, it is not necessary to mount the magnetic block 25 constituted by diving the baked body 61 one by one on the sheet and the ceramic sheet 20 can easily be fabricated.

This application is based upon and claims the benefit of priority of Japanese Patent Applications No. 2004-219754 filed on Jul. 28, 2004, No. 2004-219756 filed on Jul. 28, 2004, No. 2004-279072 filed on Sep. 27, 2004 and No. 2005-142656 filed on May 16, 2005, the contents of which are incorporated herein by reference in its entirety.

Industrial Applicability

According to the invention, it is provided an antenna apparatus used in a wireless communication medium or a wireless communication medium processing apparatus realizing thin-sized formation and small-sized formation by forming an antenna or a matching circuit directly to a surface or inside of a magnetic member promoting a magnetic field intensity necessary for expanding a communication distance by excluding an influence of a metal at a surrounding after providing flexibility and promoting durability strong at damage or destruction.

The invention claimed is:

1. An ceramic sheet, comprising:
a sheet having flexibility;
a plurality of blocks mounted on the sheet so as to be contiguous to each other, the blocks including a ceramic material;
wherein at least one of the blocks comprises:
a contact face brought into contact with the sheet;
an opposed face opposed to other of the blocks contiguous thereto; and
a non-contact face which is provided between the contact face and the opposed face and is not brought into contact with the other block.

2. The ceramic sheet according to claim 1, wherein the non-contact face includes a taper shape.

3. The ceramic sheet according to claim 1, wherein the non-contact face includes a curved face continuous from the opposed face.

4. The ceramic sheet according to claim 1, further comprising:
an other sheet mounted on the plurality of blocks.

5. The ceramic sheet according to claim 4, wherein at least one of the blocks further comprises:
other contact face brought into contact with the other sheet; and
other non-contact face that is provided between the other contact face and the opposed face and is not brought into contact with the other block.

6. The ceramic sheet according to claim 1, wherein the ceramic material includes a magnetic body.

7. The ceramic sheet according to claim 6, wherein the magnetic material includes a ferrite.

8. The ceramic sheet according to claim 6, wherein the magnetic material includes a dielectric body.

9. The ceramic sheet according to claim 8, wherein the dielectric body includes a Ti oxide.

10. The ceramic sheet according to claim 1, wherein the sheet is comprised of a plastic, and the plurality of blocks are mounted on the sheet via an adhering material.

11. The ceramic sheet according to claim 1, wherein at least one of the blocks is brought into contact with the other block via the opposed face.

12. The ceramic sheet according to claim 2, wherein the non-contact face including the taper shape occupies 15 through 90% in view of the face in a thickness direction.

13. A ceramic sheet, comprising:
two sheets having flexibility;
a plurality of blocks mounted between the two sheets so as to be contiguous to each other, the blocks including a ceramic material;
wherein at least one of the blocks comprises:
two contact faces brought into contact with the two sheets;
an opposed face opposed to other of the blocks contiguous thereto; and
a plurality of non-contact faces which are provided between the contact faces and the opposed face and is not brought into contact with the other block or each of the two sheets.

* * * * *